United States Patent [19]

Clapp

[11] Patent Number: 5,983,252
[45] Date of Patent: Nov. 9, 1999

[54] PSEUDO-RANDOM NUMBER GENERATOR CAPABLE OF EFFICIENTLY EXPLOITING PROCESSORS HAVING INSTRUCTION-LEVEL PARALLELISM AND THE USE THEREOF FOR ENCRYPTION

[75] Inventor: Craig S. K. Clapp, Boxford, Mass.

[73] Assignee: PictureTel Corporation, Andover, Mass.

[21] Appl. No.: 09/007,944

[22] Filed: Jan. 16, 1998

Related U.S. Application Data

[60] Provisional application No. 60/037,746, Jan. 17, 1997.

[51] Int. Cl.$^6$ ............................................. G06F 1/02
[52] U.S. Cl. ................................ 708/250; 380/46
[58] Field of Search ................ 364/717.01, 717.03, 364/717.04, 717.06, 717.07; 380/46, 50; 708/250, 251, 252, 253, 254, 255, 256

[56] References Cited

U.S. PATENT DOCUMENTS

| | | | |
|---|---|---|---|
| 4,047,008 | 9/1977 | Perkins | 364/717.01 |
| 4,748,576 | 5/1988 | Becker et al. | 364/717.01 |
| 4,965,881 | 10/1990 | Dilley | 380/50 |
| 5,224,165 | 6/1993 | Reinhardt et al. | 380/47 |
| 5,365,589 | 11/1994 | Gutowitz | 380/43 |
| 5,596,516 | 1/1997 | Higashi et al. | 364/717.01 |
| 5,608,801 | 3/1997 | Aiello et al. | 380/46 |
| 5,724,428 | 3/1998 | Rivest | 380/37 |

OTHER PUBLICATIONS

Rivest, "The RC5 Encryption Algorithm", Dr. Dobbs Journal, pp. 146 and 148, Jan. 1995.
D.J. Wheeler, A Bulk Data Encryption Algorithm, Fast Software Encryption (Ed.R. Anderson), Lecture Notes in Computer Science, Spring–Verlag 809:127–134, 1994.
R.J. Anderson and E. Biham, Tiger: A Fast New Hash Function, Fast Software Encryption (Ed D. Gollmann), Lecture Notes in Computer Science, Springer–Verlag, 1039:89–97, 1996.
J. Daemen et al., Resynchronization Weaknesses in Synchronous Stream Ciphers, Advances in Cryptology—Eurocrypt '93 Proceedings, Springer–Verlag, 159–167, 1994.
ISO/IEC 10166, Information Technology, Modes of operation for an n–bit block ciper algorithm, International Organization for Standardization / International Electrotechnical Commission, 1991.
R.J. Jenkins, ISAAC, Fst Software Encryption (Ed. D. Gollmann), LNCS, Springer–Verlag, 1039:41–49, 1996.
B.S. Kaliski and M.J.B. Robshaw, Fast Block Cipher Proposal, Fast Software Encryption (Ed. R. Anderson), Springer– Verlag, 809: 33–40, 1994.
NBS FIPS PUB 46–1, Data Encryption Standard, National Bureau of Standards, U.S. Department of Commerce, Jan. 1988.
NIST FIPS PUB 180–1, Secure Hash Standard, National Institute of Standards and Technology, U.S. Department of Commerce, Apr., 1995.
P. Rogaway and D. Coppersmith, A software–Optimized Encryption Agorithm, Fast Software Encryption (Ed.R. Anderson), LNCS, Springer–Verlag, 809:56–63, 1994.
B.Schneier, Applied Cryptography, Second Ecition, John Wiley & Sons, 397–398, 1996.
B.Schneier, Description of a New Variable–Length Key, 64–bit Block Cipher (Blowfish), Fast Software Encryption (Ed. R. Anderson), LNCS sprinter–Verlag, 809;191–204, 1994.
R.L. Rivest, The RC5 Encryption Algorithm, Dr. Dobb's Journal, Jan. 1995, pp. 146 and 148.

*Primary Examiner*—David H. Malzahn
*Attorney, Agent, or Firm*—Fish & Richardson P.C.

[57] ABSTRACT

In a finite state machine having a plurality of registers, a stream of pseudo-random numbers is generated by a method having characteristic non-zero integral value N. Repeatedly, over a series of time steps, a set of N combined values is calculated by applying N non-linear combining functions to N input sets of values and registering each combined value in one of N registers. At any time step after N time steps each input set consists of combined values, except that one input set may include as one value the result of combining a combined value with a value from an input stream, and at least two input sets comprise only registered values from distinct registers.

86 Claims, 13 Drawing Sheets

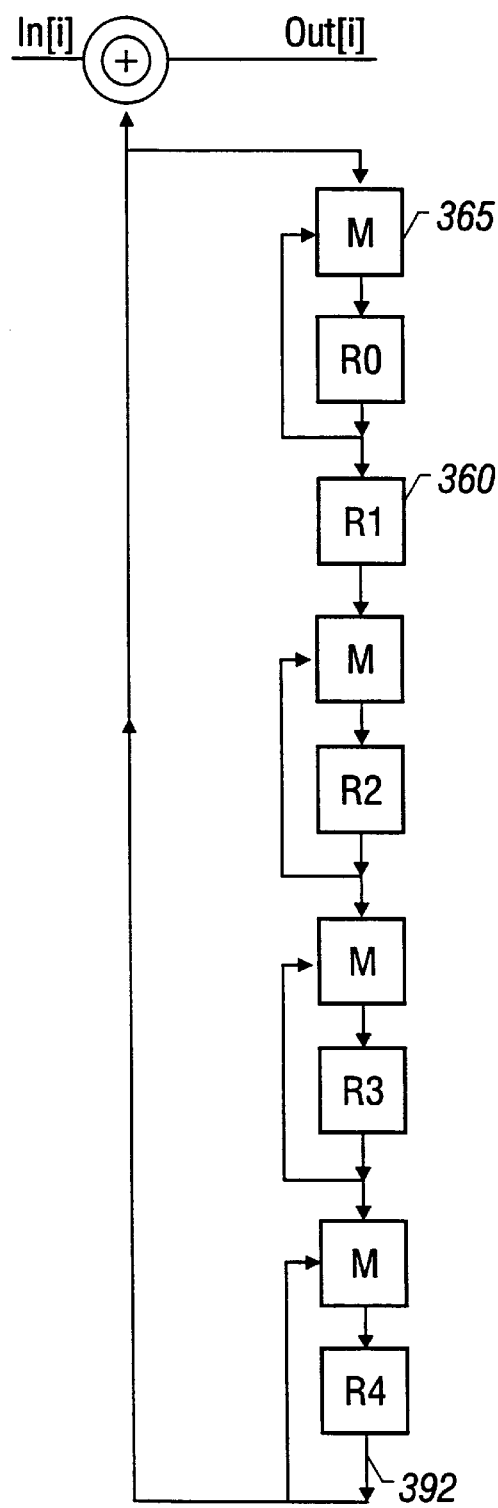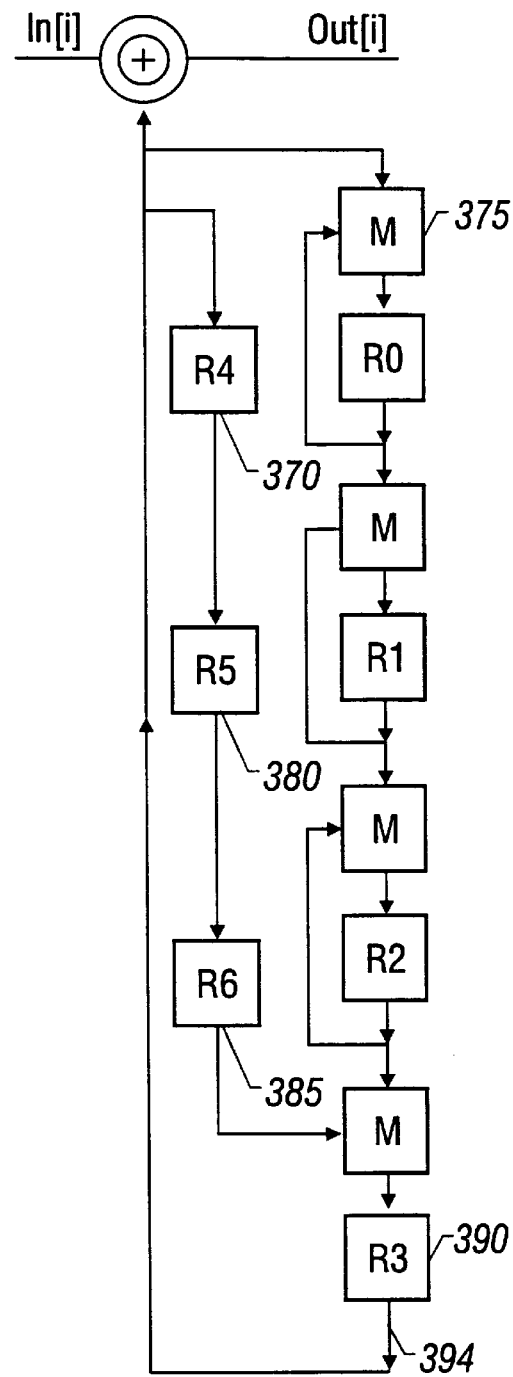
Figure 10A
Figure 10B

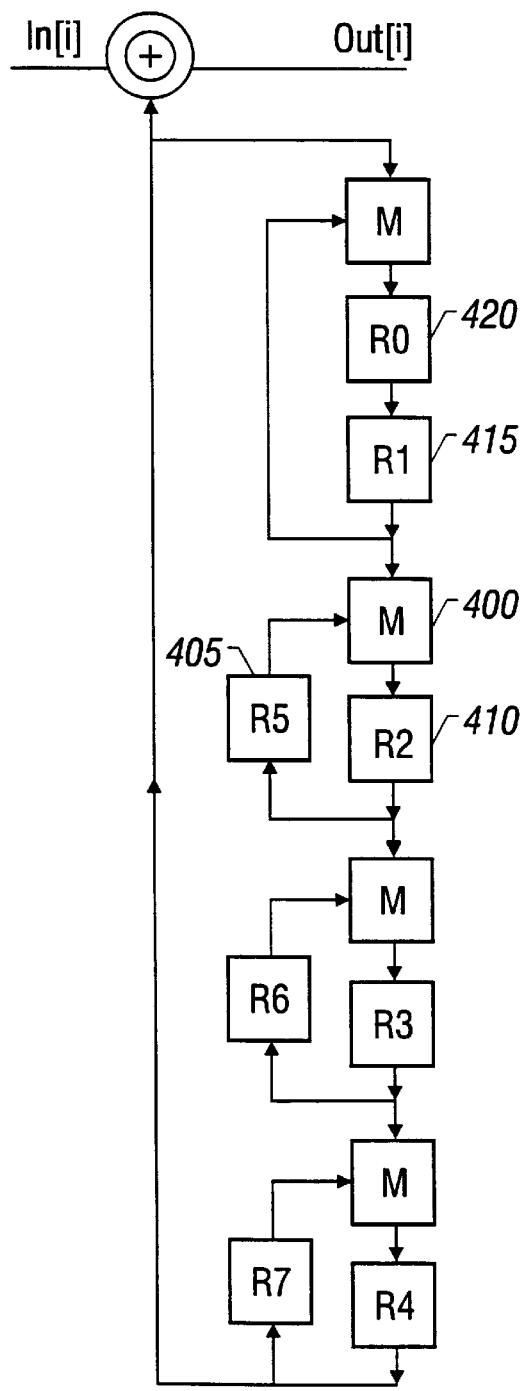
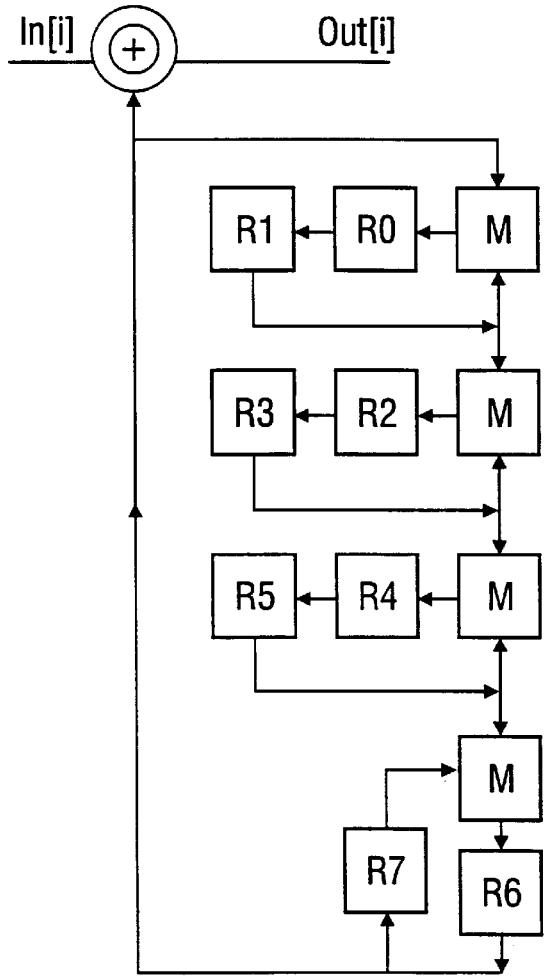
Figure 11A
Figure 11B

```
Typedef unsigned long UINT32;   /* unsigned 32 bit integers */

Void key_sched (UINT32 t_key, UINT32 *T)   /* expand t_key to look•up• table T */
{
    UINT32 x, z, p, t0;
    static UINT32 tt[8] = { 0x726a8f3b, 0xe69a3b5c, 0xd3c71fe5, 0xab3c73d2,
                            0x4d3a8eb3, 0x0396d6e8, 0x3d4c2f7a, 0x9ee27cf3 };
430 ⌐  for (p = 0; p < 4; p++)   { T[p] = t_key[p] ; }
435 ⌐  for (p = 4;p < 256; p++)
        { x = T[p-4] - T[p-1]; T [p] = (x >> 3) ^ tt [x & 7] ; }   /* (UINT32) x */
440 ⌐  for (p = 0; p < 23; p++)   ( T[p]+ = T [p+89] ; }
445 ⌐  x = T[33] ; z = (T [59] | 0x01000001) & 0xff7fffff;
450 ⌐  for (p = 0; p < 256; p++)
        { x = (x & 0xff7fffff) - z: T[p] = (T[p] & 0x00ffffff) ^ x; }
455 ⌐  x = (T[x & 0xff] ^ x) & 0xff: t0 = T[0];   T[0] = T[x] ;
460 ⌐  for (p = 1; p < 256; p++)
        { T[x] = T[p] ;   x = (T[p ^ x] ^ x) & 0xff;   T [p] = T[x] ; }
465 ⌐  T[x] = t0 ;
```

Figure 13

PSEUDO-RANDOM NUMBER GENERATOR CAPABLE OF EFFICIENTLY EXPLOITING PROCESSORS HAVING INSTRUCTION-LEVEL PARALLELISM AND THE USE THEREOF FOR ENCRYPTION

CROSS REFERENCE TO RELATED APPLICATIONS

This application claims priority from U.S. Provisional Application Ser. No. 60/037,746, filed Jan. 17, 1997.

BACKGROUND OF THE INVENTION

The invention relates generally to pseudo-random number generation, and more particularly to pseudo-random number generators efficiently executing on processors having instruction-level parallelism for generating enciphered data streams.

Many existing cipher designs stem from an era when processors exhibited little or no instruction parallelism or concurrency. The route to achieving the ultimate in performance for software based encryption algorithms for these processors was to reduce to a minimum the total number of operations required to encrypt each symbol. Examples of algorithms that epitomize this strategy are RC4, SEAL, and WAKE.

However, recent microprocessors gain much of their performance improvement over their predecessors by having a greater degree of instruction-level parallelism. Instruction-level parallelism is achieved, in part, through pipelining the execution unit or units, and in part through architectures that incorporate multiple execution units or multiple data paths that operate concurrently. Examples include superscalar, very-long-instruction-word (VLIW), and single-instruction multiple-data (SIMD) processor architectures.

Several recent cryptographic pseudo-random number generators claim to have been designed for efficient software implementation. However RC4, SEAL, and WAKE, which are three of the fastest known cryptographic pseudo-random number generators, have been analyzed and found to be incapable of efficiently exploiting the instruction-level parallelism extant in the microprocessor for which the analysis was performed and in other processors with similar instruction-level parallelism.

A known technique for introducing additional parallelism into the encoding process is that of interleaving the outputs of several generators that run concurrently. While this technique has obvious application to parallel hardware implementations, and to software implementations on multi-processors, its effectiveness on single processors having substantial instruction-level parallelism has not been demonstrated, and this method can result in reduced performance on single processors that have few internal registers as is typical of some legacy processor architectures.

When the outputs of multiple instances of a generator are interleaved, it is necessary to maintain state information for each instance of the generator. For generators that do not naturally exploit parallelism to take advantage of a processor's instruction-level parallelism, the concurrent implementation of the generators must be accomplished by interleaving their implementations on an instruction-by-instruction basis. For this method to be efficient, the processor should have enough internal registers to simultaneously hold the states of all the generators, or else there will be a performance penalty due to having to frequently save and restore generator states from memory. Also, if the generators make use of look-up-tables, as is common in fast cryptographic pseudo-random number generators, then multiple generators may dictate the need for multiple look-up-tables, which by increasing the amount of data needed to be held in cache memory can adversely affect performance.

On processors having little instruction-level parallelism, there is nothing to be gained by instruction-level interleaving of multiple generators. Therefore, an alternative strategy, that reduces the amount of state information in use at any one time to that of just one generator, while maintaining a compatible interleaved data stream, is to interleave the generators on a coarse-grained, or block-by-block, basis. However, the required fine grained interleaving of the data stream then dictates a less efficient data access pattern which, most likely, will result in lost performance through increased cache misses, whether the interleaving is performed on-the-fly or as a second pass over the data.

It is an object of the invention to achieve, on processors having sufficient instruction-level parallelism, substantially better efficiency and throughput than previously disclosed cryptographic pseudo-random number generators.

Advantageously, the ability of the invention to exploit instruction-level parallelism does not penalize its ability to also operate efficiently on older processors that have little instruction-level parallelism and those that have few internal registers. In particular, the invention does not use substantially more registers or cache memory than other fast algorithms that are poor at exploiting instruction-level parallelism.

Compared to interleaving multiple traditional generators, the invention further, advantageously, requires less state information to be maintained, which in a software implementation uses fewer registers and/or less cache memory, thus making it efficient on a broader spectrum of processors. Further, by having only one generator, the invention avoids the inconvenience and data overhead of needing to specify initialization parameters for multiple generators. (Note also that interleaved generators also suffer a performance penalty from replication of the generator initialization procedure.) Another difficulty is the need for the outputs of the multiple generators to be decorrelated from one another, which can be non-trivial to guarantee when all are essentially copies of the same state machine. A single generator, according to the invention, advantageously does not suffer these drawbacks.

The invention is advantageously amenable to the technique of interleaving and the amount of instruction-level parallelism which can be exploited is thus further increased.

The invention, advantageously, is efficient across a broad spectrum of processors, including those that have substantial instruction-level parallelism and those that have few internal registers. It is particularly advantageous to applications in which an encryption protocol is to be standardized while leaving a wide range of price/performance options available for the equipment that will implement the protocol. Such choice is especially advantageous where the encryption protocol will persist into the future in which the best price/performance trade-offs are as yet unknown.

SUMMARY OF THE INVENTION

The present invention provides a finite state machine for producing a stream of pseudo-random numbers which can be implemented on suitable parallel processors more efficiently than previously disclosed pseudo-random number generators. In one aspect, the invention features a finite state machine having two component types: non-linear w-bit mixing functions, and w-bit registers. In the operational flow diagram of the machine, every closed loop path has at least one register in it, and any closed loop path that traverses all of the mixing functions also traverses at least two registers.

In another aspect, the invention features a method for generating a stream of pseudo-random numbers in a finite state machine having a plurality of registers. The method is defined in part by non-negative integral values N, $a_i$, $b_i$, and $c_i$, for $0<i<N+1$, such that for any value of $0<i<N+1$, $a_i+b_i>0$, and at least one of $b_i$ and $c_i$ equals zero. Repeatedly, over a series of time steps, a set of N combined values is calculated by applying N non-linear combining functions to N pairs of values. Each combined value is registered in one of N registers, so that, at any time step after N time steps (a) for values of i such that $1<i<N+1$, the first value of the ith pair of values equals the value registered in the $(i-1)$th register, $a_{i-1}+c_{i-1}$ time steps prior to the current time step, and the second value of the ith pair of values equals the value registered in the ith register, $a_i+b_i$ time steps prior to the current time step. After at least N time steps, the first value of the first pair of values equals the value registered in the Nth register, $a_N+c_N$ time steps prior to the current time step, and the second value of the first pair of values equals the value registered in the first register, $a_1+b_1$ time steps prior to the current time step.

In another aspect, the invention features a method for generating a stream of pseudo-random numbers in a finite state machine having a plurality of registers. The method has characteristic non-zero integral value N. Repeatedly, over a series of time steps, a set of N combined values is calculated by applying N non-linear combining functions to N input sets of values and registering each combined value in one of N registers. At any time step after N time steps, each input set consists of combined values, except that one input set may include as one value the result of combining a combined value with a value from an input stream. At any time step after N time steps, at least two input sets comprise only registered values from distinct registers.

In another aspect, the invention provides a pseudo-random number generator having a plurality of nonlinear mixers, each such mixer having a plurality of w-bit inputs and a single w-bit output and a plurality of registers capable of holding w-bit words. The nonlinear mixers and the registers are connected in a network. The input of each of the registers is the output of another register, the output of a mixer, or an external data stream. Each of the inputs of each mixer is either the output of a register, the output of a mixer, or a stream of data generated externally to the finite state machine, and is different from any other input to said mixer. Every closed loop path that traverses all of the mixers also traverses more than one register. Every closed loop path has at least one register in it. The output of at least one of the registers or mixers is designated as the output of the finite state machine.

In another aspect, the invention features a pseudo-random number generator, having characteristic non-negative integral values N, $a_i$, $b_i$, and $c_i$, for $0<i<N+1$, such that for any value of $0<i<N+1$ $a_i+b_i>0$, and at least one of $b_i$ and $c_i$ equals zero. Elements are provided for repeatedly, over a series of time steps, calculating a set of N combined values by applying N non-linear combining functions to N pairs of values. Elements are also provided for registering each combined value in one of N registers. The pseudo-random number generator operates so that at any time step after N time steps, for values of i such that $1<i<N+1$, the first value of the ith pair of values equals the value registered in the $(i-1)$th register, $a_{i-1}+c_{i-1}$ time steps prior to the current time step, and the second value of the ith pair of values equals the value registered in the ith register, $a_i+b_i$ time steps prior to the current time step and the first value of the first pair of values equals the value registered in the Nth register, $a_N+c_N$ time steps prior to the current time step, and the second value of the first pair of values equals the value registered in the first register, $a_1+b_1$ time steps prior to the current time step.

In another aspect, the invention provides a pseudo-random number generator having characteristic non-negative integral values N, $a_i$, $b_i$, and $c_i$, for $0<i<N+1$, such that for any value of $0<i<N+1$ $a_i+b_i>0$, and at least one of $b_i$ and $c_i$ equals zero. Elements are provided for repeatedly, over a series of time steps, calculating a set of N combined values by applying N non-linear combining function to N pairs of values. Elements are provided for registering each combined value in one of N registers, so that, at any time step after N time steps. The pseudo-random number generator operates so that, for values of i such that $1<i<N+1$, the first value of the ith pair of values equals the value registered in the $(i-1)$th register, $a_{i-1}+c_{i-1}$ time steps prior to the current time step, and the second value of the ith pair of values equals the value registered in the ith register, $a_i+b_i$ time steps prior to the current time step and the first value of the first pair of values equals the value registered in the Nth register, $a_N+c_N$ time steps prior to the current time step, and the second value of the first pair of values equals the value registered in the first register, $a_i+b_i$ time steps prior to the current time step.

In another aspect, the invention provides a pseudo-random number generator having characteristic non-zero integral value N. Elements are provided for repeatedly, over a series of time steps, calculating a set of N combined values by applying N non-linear combining functions to N input sets of values. Elements are provided for registering each combined value in one of N registers. The pseudo-random number generator operates so that at any time step after N time steps each input set consists of combined values, except that one input set may include as one value the result of combining a combined value with a value from an input stream and at least two input sets comprise only registered values from distinct registers.

In another aspect, the invention provides a computer program, residing on a computer readable-medium, capable of generating pseudo-random numbers, and having characteristic non-negative integral values N, $a_i$, $b_i$, and $c_i$, for $0<i<N+1$, such that for any value of $0<i<N+1$ $a_i+b_i>0$, and at least one of $b_i$ and $c_i$ equals zero. Instructions are provided for causing a computer to repeatedly, over a series of time steps, calculate a set of N combined values by applying N non-linear combining functions to N pairs of values. Instructions are provided for causing a computer to register each combined value in one of N registers. The program operates so that at any time step after N time steps for values of i such that $1<i<N+1$, the first value of the ith pair of values equals the value registered in the $(i-1)$th register, $a_{i-1}+c_{i-1}$ time steps prior to the current time step, and the second value of the ith pair of values equals the value registered in the ith register, $a_i+b_i$ time steps prior to the current time step, and the first value of the first pair of values equals the value registered in the Nth register, $a_N+c_N$ time steps prior to the current time step, and the second value of the first pair of values equals the value registered in the first register, $a_1+b_1$ time steps prior to the current time step.

In another aspect, the invention provides a computer program, residing on a computer-readable medium, capable of generating pseudo-random numbers, and having characteristic non-negative integral values N, $a_i$, $b_i$, and $c_i$, for $0<i<N+1$, such that for any value of $0<i<N+1$ $a_i+b_i>0$, and at least one of $b_i$ and $c_i$ equals zero. Instructions are provided for causing a computer to repeatedly, over a series of time steps, calculate a set of N combined values by applying N non-linear combining functions to N pairs of values. Instructions are provided for causing a computer to register each combined value in one of N registers. A program operates so that, at any time step after N time steps, for values of i such that $1<i<N+1$, the first value of the ith pair of values equals the value registered in the (i–1)th register, $a_{i-1}+c_{i-1}$ time steps prior to the current time step, and the second value of the ith pair of values equals the value registered in the ith register, $a_i+b_i$ time steps prior to the current time step, and the first value of the first pair of values equals the value registered in the Nth register, $a_N+c_N$ time steps prior to the current time step, and the second value of the first pair of values equals the value registered in the first register, $a_1+b_1$ time steps prior to the current time step.

In another aspect, the invention provides a computer program, residing on a computer readable medium, capable of generating pseudo-random numbers, and having characteristic non-zero integral value N. Instructions are provided for causing a computer to repeatedly, over a series of time steps, calculate a set of N combined values by applying N non-linear combining functions to N input sets of values. Instructions are provided for causing a computer to register each combined value in one of N registers. The program operates so that at any time step after N time steps, each input set consists of combined values, except that one input set may include as one value the result of combining a combined value with a value from an input stream and at least two input sets comprise only registered values from distinct registers.

Preferred implementations may include one or more of the following features.

For values of i, such that $0<i<N$, $a_i=1$ and $b_i=0$, and $a_N=0$ and $b_N=1$.

For values of i, such that $1<i<N$, $a_i=1$ and $b_i=0$ or 1, $a_1=1$, $b_1=1$, $a_N=1$ and $b_N=0$.

Each non-linear combining function combines two inputs into an intermediate value using a second combining function, extracts the low byte of said intermediate value and, using the low byte as an index into a lookup table, and combines the output of the lookup table with said intermediate value logically shifted right 8-bits using a third combining function.

One of the intermediate combining functions is exclusive-OR and the other intermediate combining function is either PLUS or MINUS.

The non-linear mixing functions of the invention have two input nodes.

The output of the pseudo-random number generator is combined using a suitable function (for example exclusive-OR) with a stream of plaintext to create a stream of ciphertext.

The output of each mixing function is fed back to one of its input nodes through a path in the operational flow diagram that includes no other mixing functions.

The mixing functions of a particular embodiment of the invention are identical.

The method of the mixing functions of the invention includes combining the contents of a lookup table with the inputs of the function to produce the output of the function.

The pseudo-random number generator is reversible.

No closed loop path through the operational flow diagram of the pseudo-random number generator traverses more mixing functions than registers.

Every closed loop path through the operational flow diagram of the pseudo-random number generator traverses more registers than mixing functions.

The finite state machine is implemented on a parallel processor having instruction-level parallelism.

The pseudo-random number generator uses the mixing function used in the WAKE cipher.

There are a sufficient number of mixing functions in the pseudo-random generator so that the output of the pseudo-random number generator exhibits at least as many bits of pseudo-randomness as there are bits in a register.

The greatest common divisor of the number of registers in each closed loop in the operational flow diagram of the pseudo-random number generator is unity.

The output node of the pseudo-random number generator is a node in the operational flow diagram having the fewest registers in series with it.

Other features and advantages of the invention will become apparent from the following description of preferred embodiments, including the drawings, and from the claims.

BRIEF DESCRIPTION OF THE DRAWINGS

FIG. 10(a) is an operational flow diagram of a pseudo-random number generator according to the invention, having a value of r equal to one, and used as a cipher in output-feedback mode.

FIG. 10(b) is an operational flow diagram of a pseudo-random number generator according to the invention, having a value of r equal to one, and used as a cipher in output-feedback mode.

FIG. 11(a) is an operational flow diagram of a pseudo-random number generator according to the invention, having a value of r less than one, and used as a cipher in output-feedback mode.

FIG. 11(b) is an operational flow diagram of a pseudo-random number generator according to the invention, having a value of r less than one, and used as a cipher in output-feedback mode.

FIG. 13 is C code implementing the procedure key_sched for initializing the lookup table in a non-linear mixing function.

DESCRIPTION OF THE PREFERRED EMBODIMENTS

Figure 1:
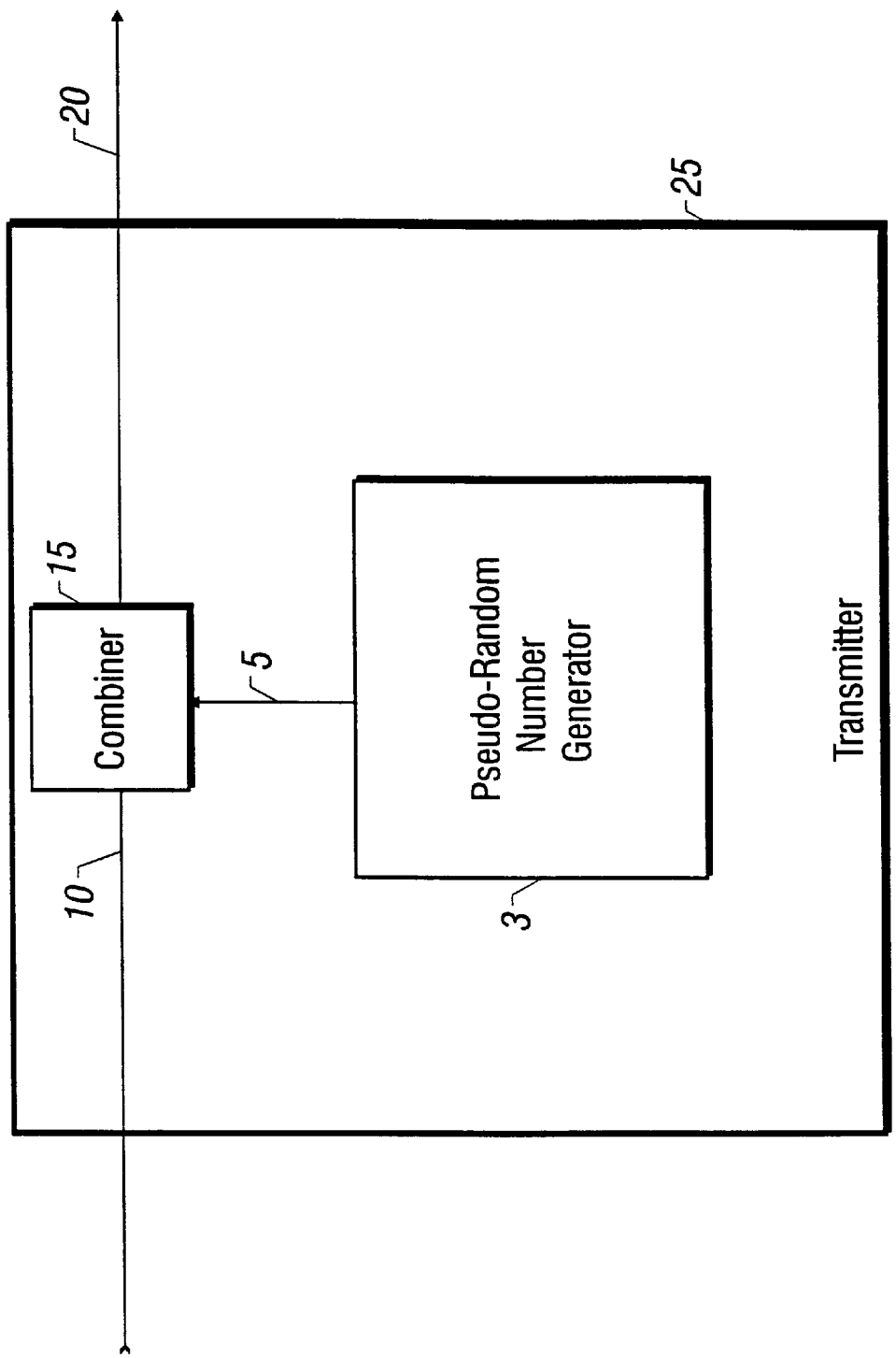
FIG. 1 is a block diagram of a transmitter capable of combining a stream generated by a pseudo-random number generator with an input stream of plaintext to create a stream of ciphertext for transmission to a decoder.

Referring to FIG. 1, the invention, in one application, provides a pseudo-random bitstream from a pseudo-random number generator 3, over a line 5, which can be combined with a datastream to be encoded over a line 10, for example, using an exclusive-OR operation in a combiner 15, to produce a resulting bitstream over a line 20 for transmission to a decoding receiver (not shown). The resulting transmitter 25 is particularly suited to operate with increased efficiency when programmed on a computer system in which instruction level parallelism is available and used. The structure of the pseudo-random number generator 3 can be implemented entirely in software, in hardware, or in a combination of the two depending upon the particular processor being used. In a particular system, the invention uses the computer processor and its associated registers as is described in more detail below, to effect the high efficiency use of the system.

The pseudo-random number generator 3 of the invention is a finite state machine having, in the illustrated embodiments, two component types (one or more of which can be implemented in software): non-linear w-bit mixing functions, and w-bit registers. A complete generator 30 consists of a plurality of both component types, connected together in configurations subject to the topological constraints detailed below.

In a preferred embodiment, the invention uses efficiently computable non-linear mixing functions that accept two w-bit digital inputs, x and y, and produce a single w-bit digital output z; however mixing functions with greater than two inputs can also be used. In a preferred embodiment, the primitive operations from which the non-linear mixing functions are constructed are chosen from those that are efficiently implemented by native instructions available on common microprocessors. For efficiency of the implementation in software, w can preferably be chosen to be the native word-length of the datapaths of the target processors.

Figure 4A:
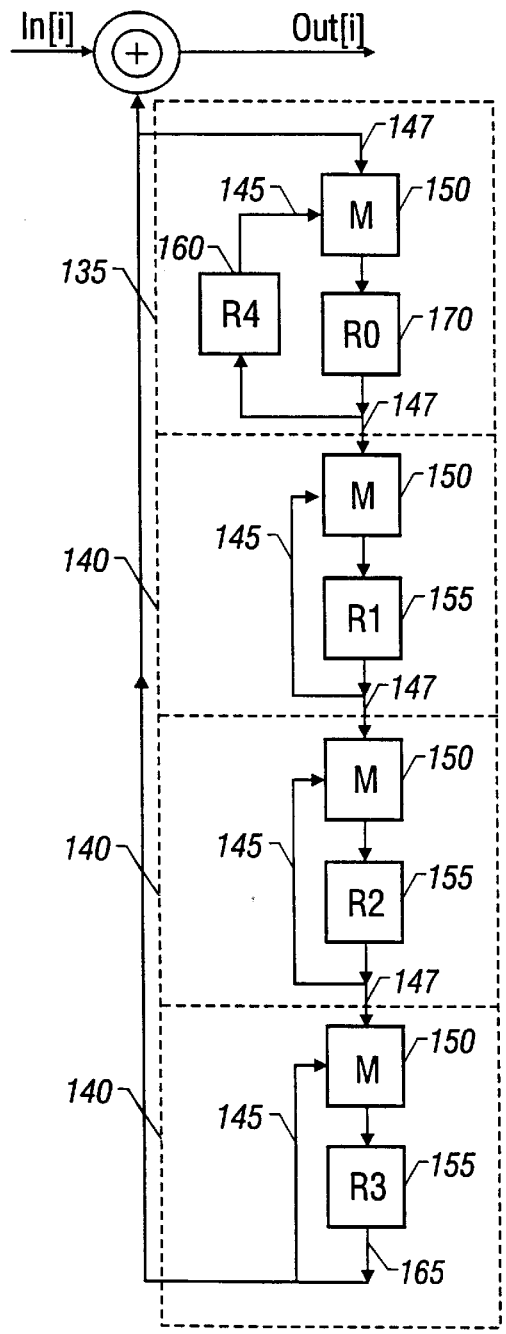
FIG. 4(a) is an operational flow diagram of the Wider-Wake pseudo-random number generator according to the invention, having four mixing functions and five registers, and used as a cipher in output-feedback mode.
Figure 4B:
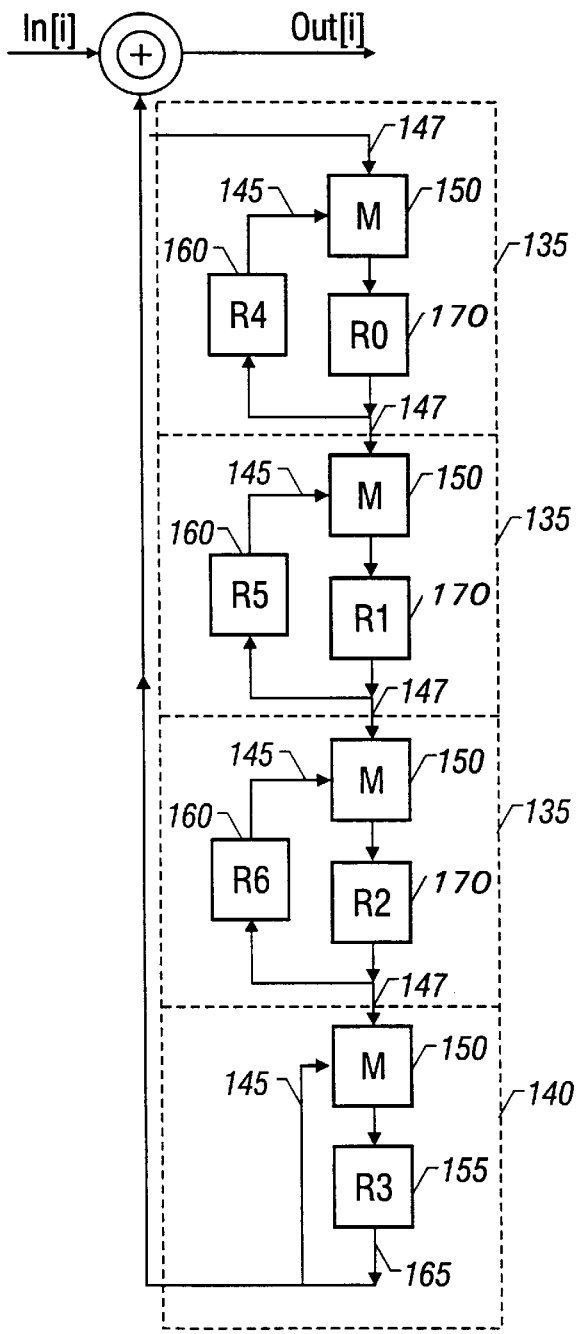
FIG. 4(b) is an operational flow diagram of the Wider-Wake pseudo-random number generator according to the invention, having four mixing functions and seven registers, and used as a cipher in output-feedback mode.
Figure 8:
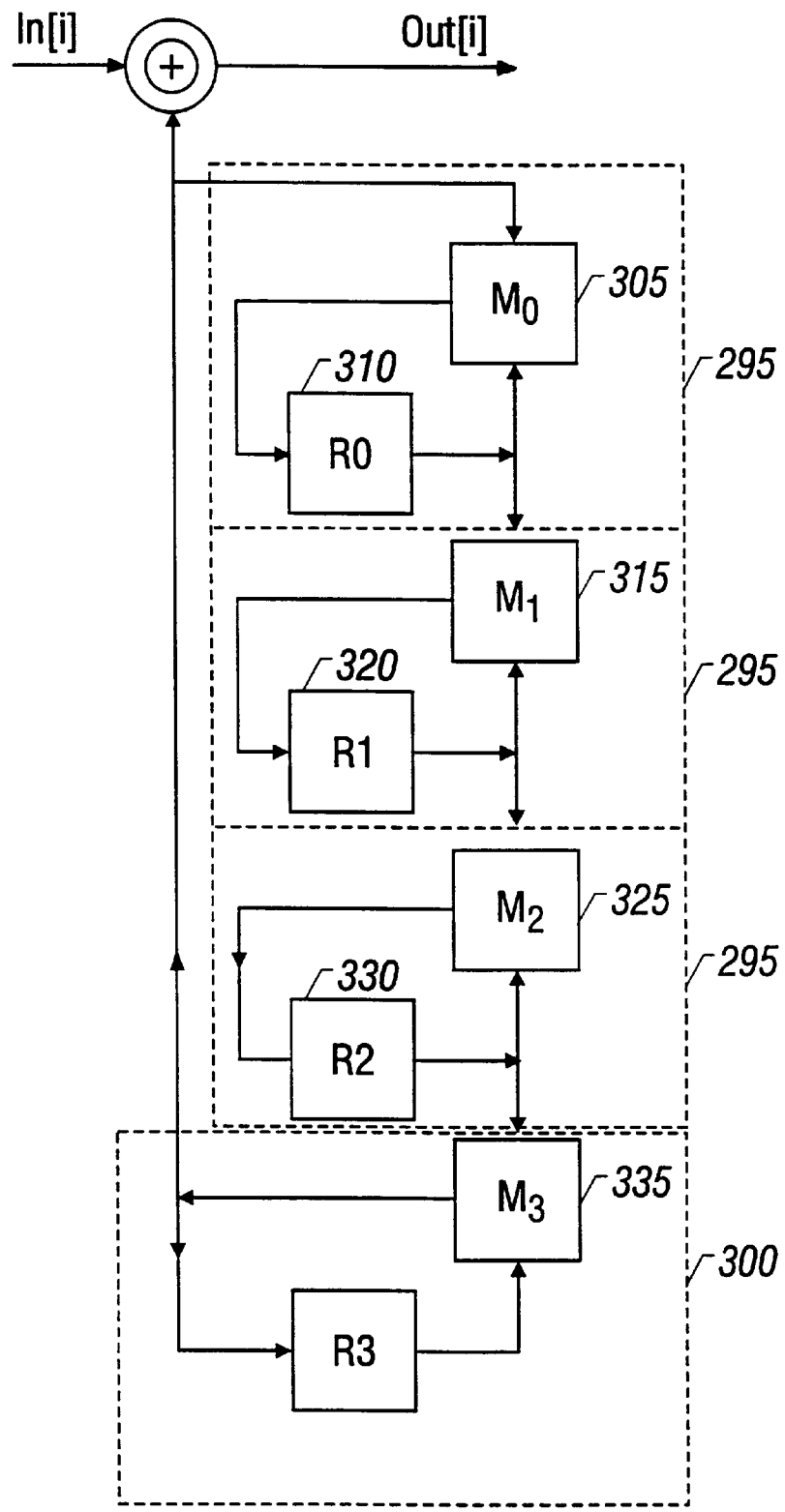
FIG. 8 is an operational flow diagram of the WAKE-ROFB pseudo-random number generator according to the invention, used as a cipher in output-feedback mode.

There is no requirement that all non-linear mixing functions used in a given generator be of the same design, but in a typical embodiment all non-linear mixing functions will be either of the same or closely related design so that the generator does not lose efficiency when implemented on a SIMD architecture. Typical examples of useful topologies, according to the invention, are illustrated in FIGS. 4(a), 4(b) and 8, and described in more detail below.

In the preferred embodiments, a significant characteristic of the non-linear mixing functions is that given the output z and one of the inputs x or y, the other input is uniquely determined, that is, the non-linear mixing functions are invertible. This is a useful feature because it enables the construction of reversible networks, the output of which are known to have longer average cycle lengths than non-reversible networks with an equivalent number of states.

Figure 2:
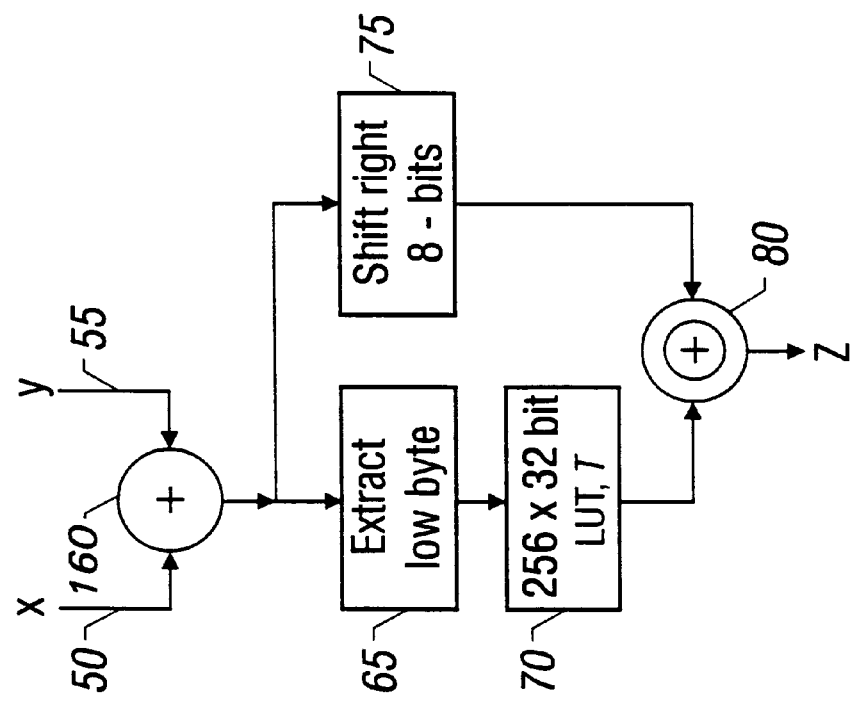
FIG. 2 is an operational flow diagram illustrating the mixing function used in the WAKE cipher.

A typical example of a non-linear mixing function is the mixing function used by the well-known WAKE cipher and illustrated in FIG. 2. The function has two inputs x 50 and y 55, which are 32-bit words. First, x and y are added together to form an intermediate sum (step 60), with any carry from the 32nd bit being discarded. The low byte of the sum is extracted by applying a logical AND operation with the value 255 (step 65). A value is then retrieved from a 256×32 bit lookup table, using the result of the logical AND operation as an index into the table (step 70). A logical eight bit right shift is performed on the intermediate sum (step 75), and the result of this operation is combined with the result of the table lookup using a logical exclusive-OR operation (step 80), producing the output of the function.

For the WAKE mixing function illustrated in FIG. 2 to be invertible, as in the preferred embodiment, the requirements on the lookup-table are that it contain pseudo-random entries in the three lower byte positions of each 32-bit entry (that is, entries which are generated by a pseudo-random number generator), and a pseudo-random permutation in the upper byte position (that is, the upper byte position of each entry must contain a distinct one of the numbers zero through 255 in a random order).

For any given design of non-linear mixing function, an estimate can be made of the number of bits of pseudo-randomness, p, that the function introduces into its output. In a typical efficient embodiment, substantially all of the pseudo-randomness comes from a table-look-up operation, for which p is the base-2 logarithm of the number of words in the table. For efficient operation, the table size is chosen to fit comfortably into the cache memory of typical microprocessors, which for modern 32-bit processors limits p to be significantly less than the processor word-length, that is, typically p is substantially less than w.

Figure 3:
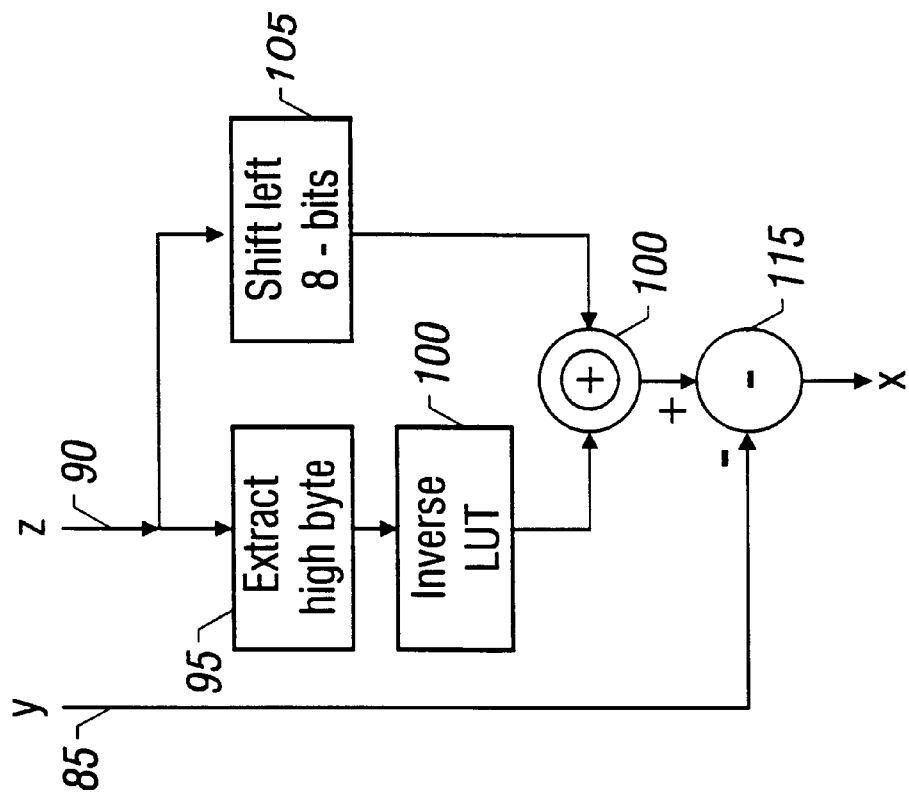
FIG. 3 is an operational flow diagram illustrating the inverse of the mixing function used in the WAKE cipher.

Another embodiment of the non-linear mixing function is the inverse of the mixing function used in the WAKE cipher. The operational flow diagram for this function is illustrated in FIG. 3. The function has two inputs y 85 and z 90. The high byte of z is extracted by applying a logical right shift of 24 bits (step 95). A value is then retrieved from a 256×32 bit lookup table, using the extracted high byte as an index (step 100). A logical left shift is applied to the value of z (step 105), and the result is combined with the value from the lookup table using an exclusive-OR operation (step 110). Finally, the value of y is subtracted from this result (modulo 2 to the 32nd power) (step 115) to produce the output of the function.

Generally, mixing functions having the structure shown in FIG. 2 are preferred if one of the operations at steps 60 and 80 is an exclusive-OR, and the other operation is a PLUS or a MINUS. Similarly, mixing functions having the structure shown in FIG. 3 are preferred if one of the operations at steps 110 and 115 is an exclusive-OR, and the other operation is a PLUS or a MINUS.

The pseudo-random number generator, according to a preferred, particular embodiment of the invention consists of a cascade of n stages, where each stage is composed of one non-linear w-bit mixing function and one or more registers. Stages need not be identical either in the number of registers or in the particular non-linear mixing function used. A complete generator, according to the preferred embodiment, is thus composed of n non-linear mixing functions (assuming one mixing function per stage) and m registers, where m is equal to or greater than n.

In a preferred embodiment, the number of stages, n, is chosen such that the estimated number of bits of pseudo-randomness, p, contributed by each of the n stages, sums to at least w. In the typical case in which all stages contribute the same estimated number of bits of pseudo randomness, p, n is chosen to be not less than w/p. For the non-linear mixing function used in the WAKE cipher, which has w equal to 32 and p equal to 8, the minimum number of stages is 4.

In a preferred embodiment, and referring to illustrative FIGS. 4(a) and 4(b), for each stage 135 and 140, one input 145 of the non-linear mixing function 150 is received from one of the registers 155 or 160 in that stage, while the other input 147 is received from the previous stage, with the first stage receiving an output 165 from the "last" stage of the generator thus forming an overall loop in the network. The input of each register in a stage is received either from the output of another register in that stage (for example the output of register 170 is the input of register 160) or from the output of that stage's non-linear mixing function (for example registers 155 and 170 receive an input from the output of their stage's respective mixing functions).

Figure 5:
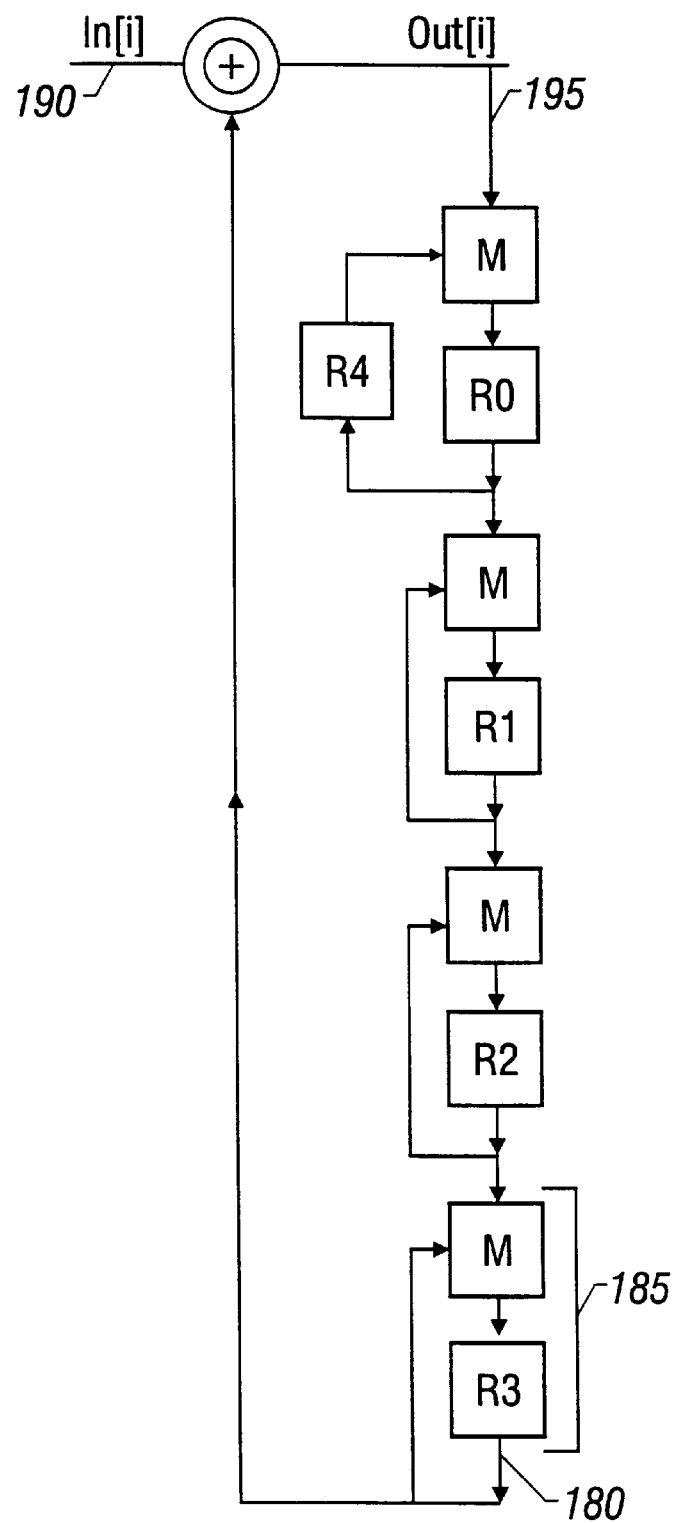
FIG. 5 is an operational flow diagram of a pseudo-random number generator according to the invention, used for encryption in cipher-feedback mode.

In another embodiment, referring to FIG. 5, an output 180 of a last stage 185 can be modified by mixing it (for example by a bitwise exclusive-OR) with a stream 190 of data before becoming the input 195 to the first stage.

Figure 6:
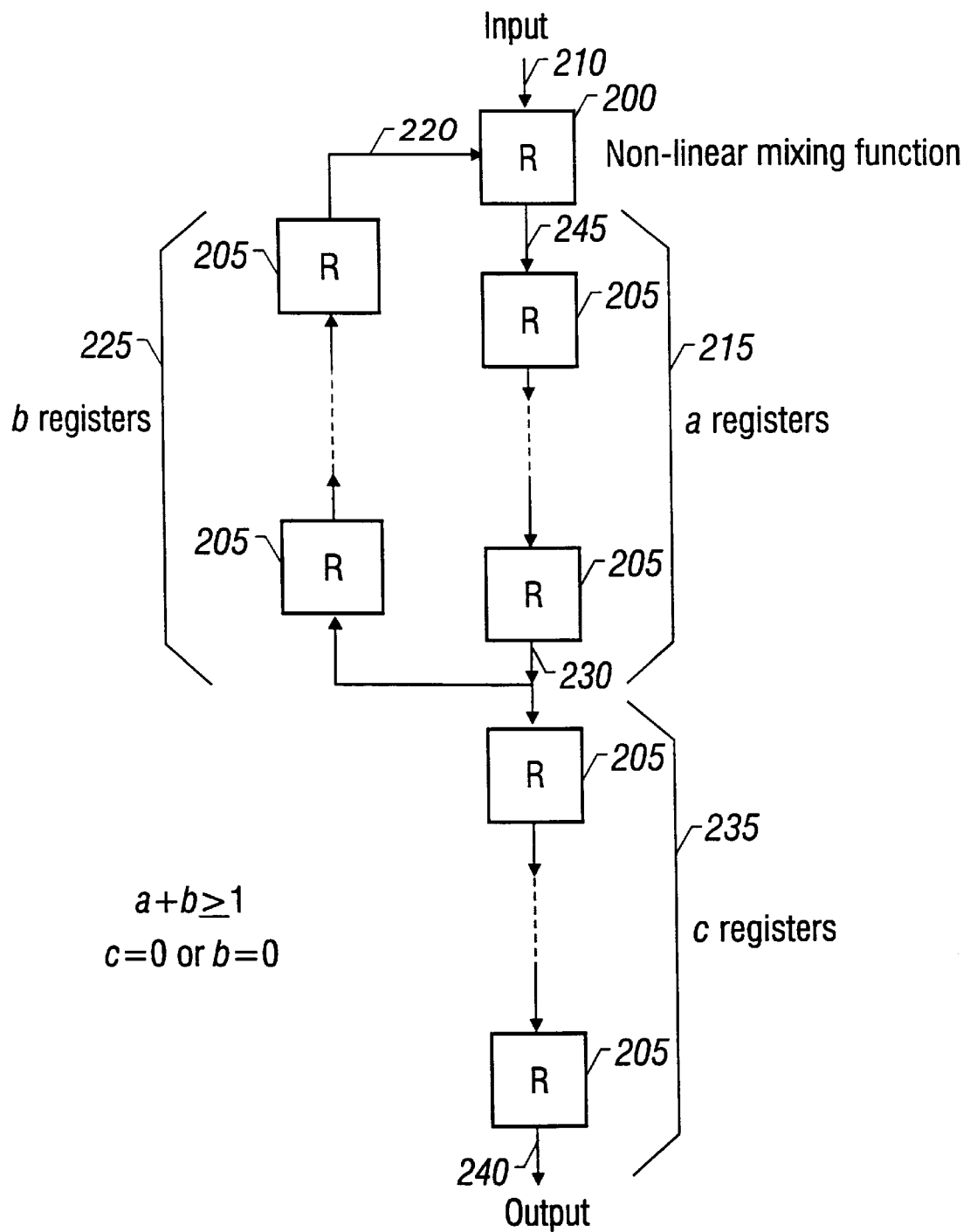
FIG. 6 is an illustration of a stage in a preferred embodiment of the invention.

The output from a stage may be either the output from one of its registers or the output of its non-linear mixing function. FIG. 6 shows the general form of a single stage having one non-linear mixing function 200 and one or more registers 205. The input 210 to the stage goes to one of the input nodes of the non-linear mixing function 200. The output of the non-linear mixing function 200 then passes through a series 215 of a (where a is greater than or equal to zero) registers 205, followed by a series 225 of b (where b is greater than or equal to zero) registers 205, such that a+b is greater than or equal to one. The output 220 of the last of the series 225 of b registers 205 (or, if b is equal to zero, the last of the series 215 of a registers 205) goes to the remaining input node of the non-linear mixing function 200. If b is equal to zero, the output 230 of the last of the series 215 of a registers goes to the mixing function 200 and also goes to a series 235 of c registers (where c is greater than or equal to zero). The output 240 of the last of the series 235 of c registers 205 (or, if c is equal to zero, the output 230 of the last of the series 215 of a registers 205, or if a is also equal to zero, the output 245 of the non-linear mixing function 200) is the output of the stage.

In a preferred embodiment, the stages are cascaded in such a fashion so that for any closed loop path through the network (for example the path from mixing function 150 to register 170 to register 160 to mixing function 150 in FIG. 4(a)), the maximum quotient of the number of mixing functions traversed in the path divided by the number of registers traversed in that same path, is significantly less than n, the total number of mixing functions for the generator.

If we call this maximum quotient value r, then the number of non-linear mixing functions that can be computed in parallel is at least n/r. The larger the value of n/r, the better suited is the generator to implementation on a processor having instruction-level parallelism.

Figure 7:
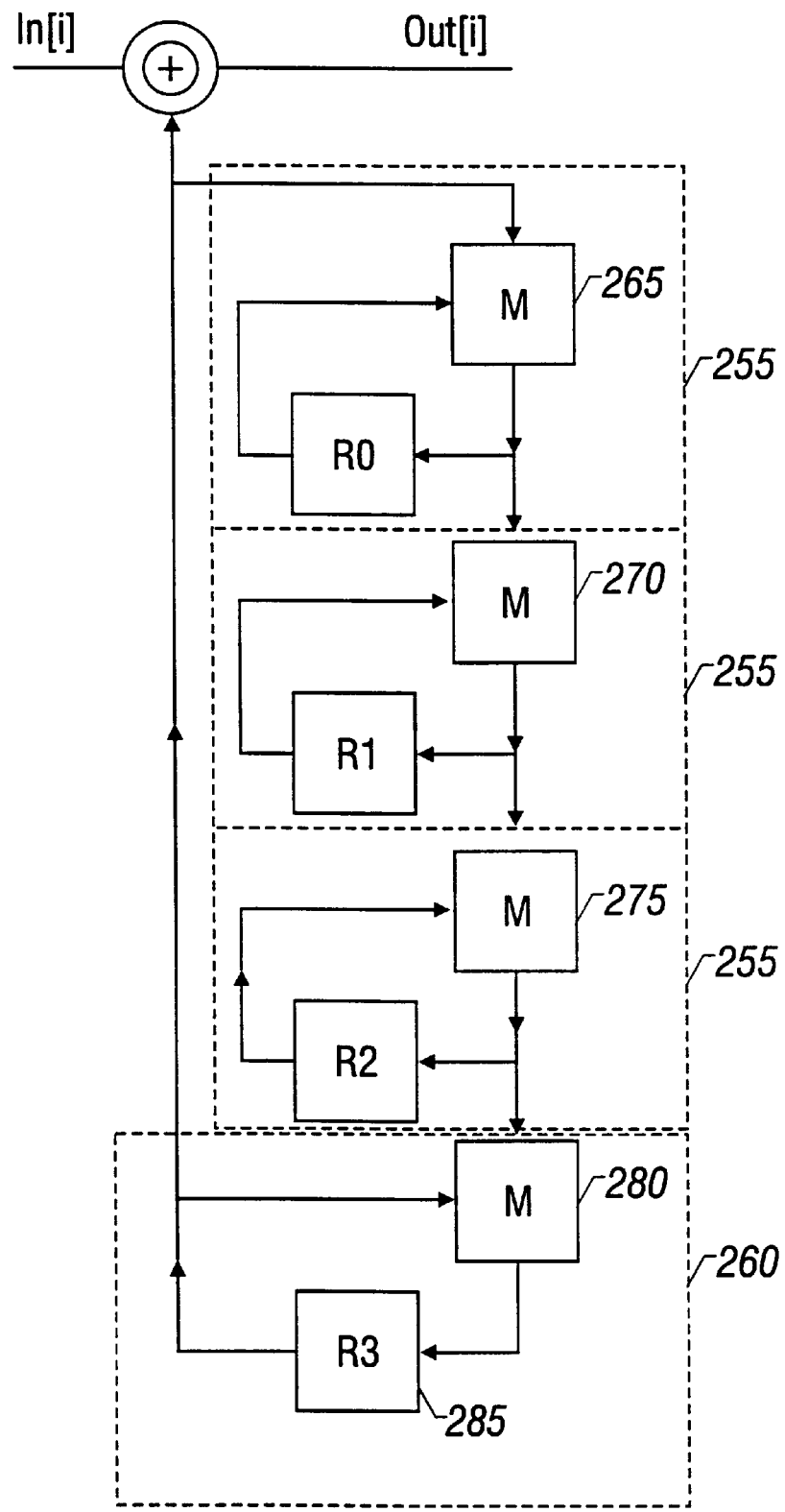
FIG. 7 is an operational flow diagram of the WAKE pseudo-random number generator used as a cipher in output-feedback mode.

As illustrated in FIG. 7, the operational flow diagram of the well-known WAKE cipher consists of n−1 identical stages 255, and a distinct final stage 260. The closed loop path from mixing function 265 through mixing functions 270, 275, and 280, through register 285 and back to mixing function 265, traverses all n of the mixing functions in the flow diagram and one register, thus producing a value for r equal to n. The resulting value of n/r for WAKE equals 1 and WAKE therefore exhibits no circumstances under which its non-linear mixing functions can be computed in parallel.

By comparison, in a preferred embodiment designated as WAKE-ROFB, the value of n/r is n−1. As illustrated in FIG. 8, WAKE-ROFB consists of n−1 identical stages 295 and a distinct final stage 300. The closed loop with the greatest value of r is the loop beginning at component 305, and continuing through components 310–335 and then returning to 305. This loop traverses equal numbers of mixing functions and registers in each stage 295. In the final stage 300, a mixing function is traversed but no registers are traversed. Thus the value of r for this loop will always be n/n−1 and thus n/r will always equal n−1.

In another preferred embodiment, designated WiderWake, n/r is n. As illustrated in FIGS. 4(a) and 4(b), WiderWake consists of one or more of a first type of stage 135 followed by one or more of a second type of stage 140. The closed loop path in each second type of stage 140 traverses one mixing function 150 and one register 155, and thus has an r value of one. No other closed loop in WiderWake has an r value greater than one. With n equal to four (that is, four mixing functions), WAKE-ROFB and WiderWake show a 3:1 and 4:1 advantage over four stage WAKE respectively. With n equal to five the advantages grow to 4:1 and 5:1 over five stage WAKE respectively.

Another characteristic of the preferred embodiments of the invention is that the state machine formed by the configuration of non-linear mixing functions and registers be reversible, that is, that for every state of the machine there exists a unique previous state.

This condition can be achieved by the non-linear mixing functions having two inputs and being invertible (as defined above), and the topology of the operational flow diagram being such that at least one of the mixing functions having an output which is registered also have at least one of its two input nodes in common with the input of a register. This additional constraint guarantees that when the method is executed through one iteration, one of the inputs of this function, along with its output, will be stored in a register, thus permitting those values to be used in the reverse computation of that function (which by definition can be achieved given the output and one input). The result of this reverse computation can then be used to reverse the computation of the remaining mixing functions.

Figure 9:
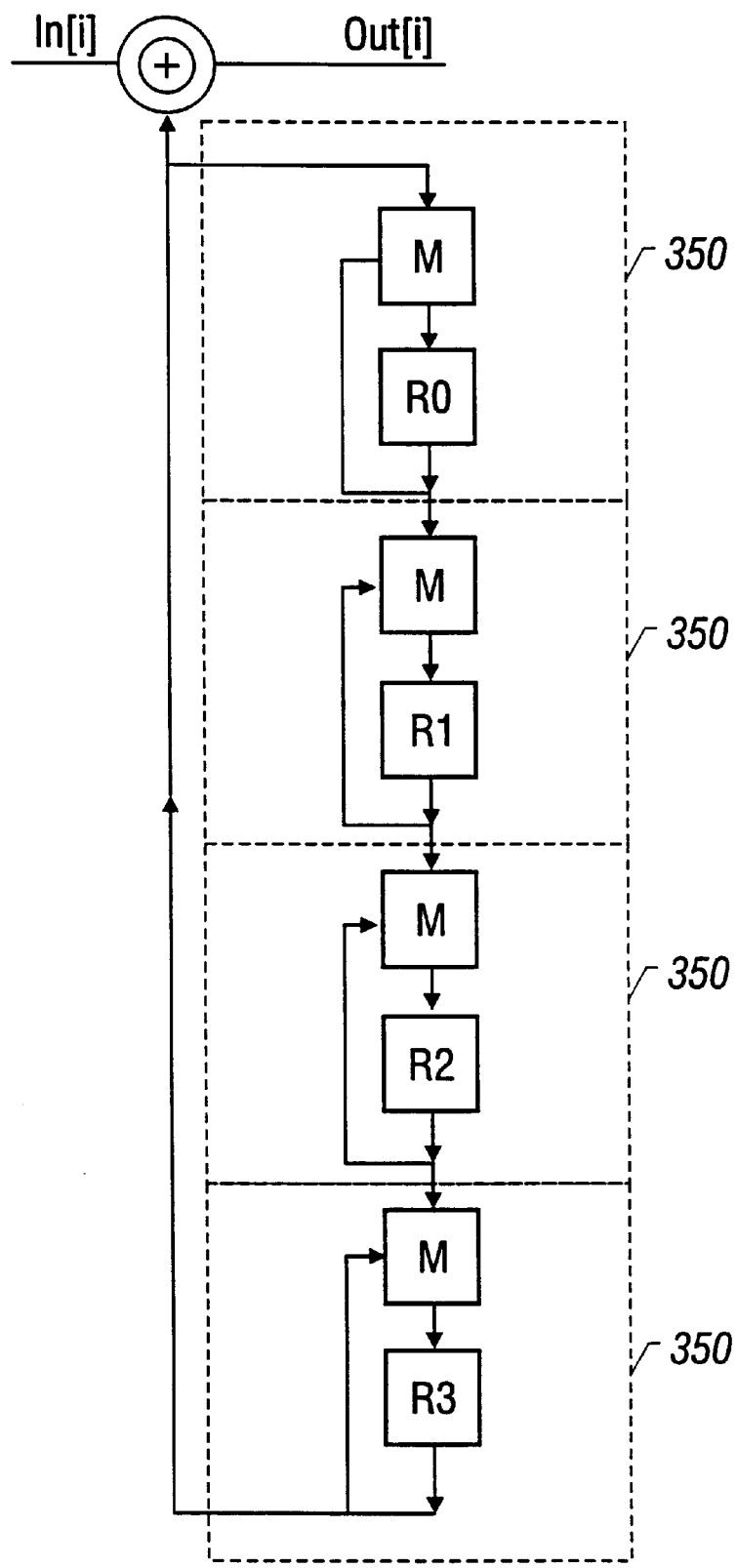
FIG. 9 is an operational flow diagram of the Pipelined-WAKE pseudo-random number generator according to the invention, used as a cipher in output-feedback mode.

FIG. 9 illustrates the operational flow diagram for another embodiment, designated as Pipelined-WAKE, consisting of n identical stages 350. Here, r is also equal to one and hence n/r is equal to n. However, the additional topological constraint of reversibility is not met by Pipelined-WAKE, and hence Pipelined WAKE is not a preferred embodiment of the invention.

Two further embodiments having r equal to one and hence n/r equal to n, and that meet the topological constraints specified for a preferred embodiment, are shown in FIGS. 10(a) and 10(b). The embodiment shown in FIG. 10(a) is identical to Pipelined-WAKE except that an extra register 360 is added. This embodiment meets the topological constraint because register 360 shares a common input with mixing function 365. In FIG. 10(b), register 370 shares a common input with mixing function 375 and thus also satisfies the topological constraint for reversibility.

Two other embodiments, illustrating a value of r less than one and hence a value of n/r greater than n while meeting the topological constraints specified for a preferred embodiment, are shown in FIGS. 11(a) and 11(b). The embodiments in FIGS. 11(a) and 11(b) have r less than one because every closed loop path entails traversing at least one register more than the number of mixing functions traversed.

For the case that n/r is greater than n, there is possible more than an n-fold parallelism for determining of the mixing function outputs. For example, in the embodiment in FIG. 11(a), mixing function 400 takes as inputs the values of registers 415 and 405. These registers, in turn, receive inputs from registers 420 and 410, respectively. Thus, in a pipelined implementation, mixing function 400 can begin to be applied to the values of registers 420 and 410 even before its application to registers 415 and 405 has completed.

Figure 12:
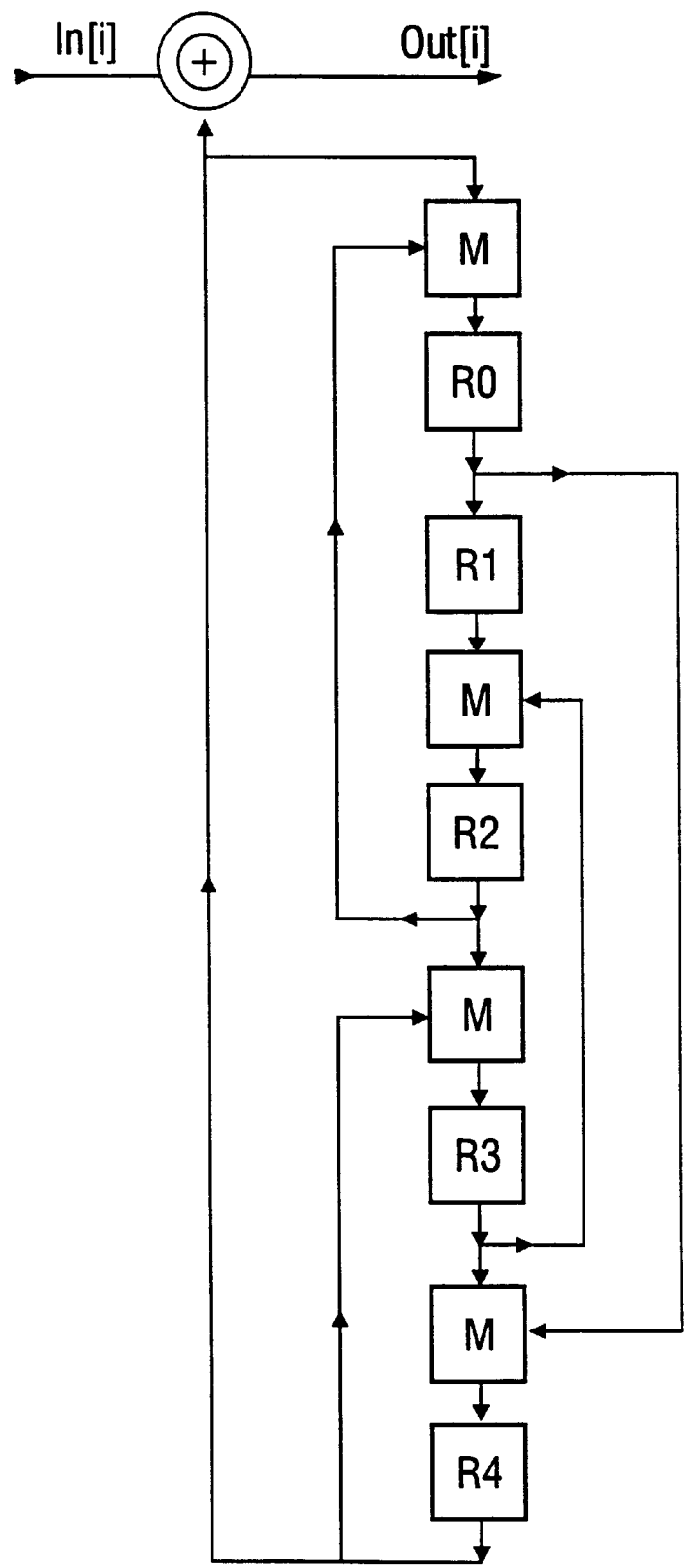
FIG. 12 is an operational flow diagram of a pseudo-random number generator according to the invention, which is not constructed from stages, used as a cipher in output-feedback mode.

In another embodiment, illustrated in FIG. 12, the operational flow diagram is not formed as a cascade of stages, but, instead, it is constructed from a set of m registers and n mixing functions so that all of the inputs to each mixing function are distinct, every closed loop path traverses at least one register, and every closed loop path that traverses all of the mixing functions also traverses more than one register.

For any operational flow diagram the number of registers traversed for every closed-loop path (the "loop order") can be enumerated and the greatest common divisor (GCD) among them can be calculated. For each of the illustrated networks this GCD is unity. For example, in FIG. 8, the loops are (305, 310, 305), (315, 320, 315), (325, 330, 325), (335, 340, 335), and (305, 310, 315, 320, 325, 330, 335, 340); with the number of registers being traversed equal to 1, 1, 1, 1, and 3 respectively. An operational flow diagram having the GCD of its loop orders being greater than unity can be decomposed into a set of operational flow diagrams each with a GCD of unity and whose outputs are interleaved. These component operational flow diagrams may or may not meet the terms set forth herein which are necessary to advantageously operate on processors having instruction level parallelism. Since interleaving is discussed earlier as an alternative technique for introducing instruction-level parallelism, such operational flow diagrams are not considered separately here.

Any one node of the network may be chosen as the output from which to draw w-bits of pseudo-random data each time that node is updated. Since all nodes have the same update rate, there is no particular advantage in terms of pseudo-randomness of picking one node over another.

However, in a preferred embodiment useful for cryptographic purposes, the output node is one having the least number of registers in series with it, thus reducing the amount of "state of the machine" which can be directly inferred from the output. FIG. 10(a) illustrates output from a preferred node 392 while FIG. 10(b) illustrates an output taken from a non-preferred node 394 since the node is in series with registers 390, 370, 380, and 385.

A preferred embodiment uses a technique known as "output-feedback mode" to encrypt a stream of plaintext data. In this embodiment, each w-bit output of the pseudo-random number generator is combined with w-bit segments of the plaintext. The combination is typically performed by a bit-by-bit exclusive-OR operation on the corresponding bits of the plaintext and the generator output. Decryption is achieved by performing the inverse operation on the ciphertext and the output of another generator that has been initialized to create an identical output sequence to that used for encryption.

FIGS. 4(a), 4(b), 7–9, 10(a), 10(b), 11(a), 11(b) and 12 illustrate generators in output-feedback mode.

In an alternative embodiment, using the known technique identified as the "cipher-feedback mode," the operational flow diagram is modified so that after the output of the pseudo-random number generator is combined with a w-bit segment of plaintext, the result of that combination is used as the input to the first stage of the operational flow diagram. This mode of operation is susceptible to a chosen-plaintext attack, and so should not be used when such an attack is plausible. An example is illustrated in FIG. 5.

In a preferred embodiment, there is a set of resynchronization functions which permit the parameters of two or more pseudo-random number generators (i.e. the initial values of the registers and the lookup tables of the mixing functions) to be set to an identical state. The resynchronization functions preferably take as an input a relatively small size secret key. The key should not be so small that all possible values can be exhaustively tested by an attacker in a reasonable amount of time. A typical "relatively small size" is 128 bits.

One method for resynchronizing a mixing function lookup table is illustrated by the procedure key_sched shown in FIG. 13. A key of 128 bits (four 32 bit words) is used. First, the first four words of the table T[ ], are filled with the value of the four words of the key, t_key[ ] (step 430). Next, the remaining entries of T[ ] are filled by, for each T[p], calculating an intermediate value x equal to T[p−1]+T[p−4], and then setting T[p] equal to x logical right shifted 3 bits exclusive-ORed with tt[x&7], where tt[ ] is a table of 8 words having a permutation in the top 3 bits (that is, each of the numbers zero through seven is represented in those top bits in random order) (step 435). (The symbol "&" as used here indicates the bitwise logical AND function.) Next, the 23 elements from T[89] onwards are added to the 23 elements from T[0] onwards (step 440). Next, a crude permutation of the top byte of each element in T[ ] is generated while further mixing the lower bits of T[ ] (steps 445, 450). Finally, the table is permuted randomly using some bits of it to control the permutation (steps 455, 460 and 465).

However any cryptographically secure method of generating pseudo-random entries in the three lower byte positions of each 32-bit entry and a pseudo-random permutation in the upper byte position is equally suitable.

One method for resynchronizing the registers is to combine the secret key with a publicly known initialization vector by way of a cryptographic hash function, and using the resulting output to set the states of the registers. The initialization vector is changed for each re-synchronization.

In another method for resynchronizing the registers, the registers are set initially to some simple combination (for example, a linear combination) of the secret key and the initialization vector, and the generator is stepped until they are satisfactorily mixed, discarding the generator's output along the way. In a preferred embodiment, the number of generator output values discarded is no less than twice the number of steps it takes for the output node to become a function of all initial register states, or twice the number of registers in the longest closed-loop path through the network, whichever is the greater number.

Since table initialization and register resynchronization are typically infrequent operations, their efficiency (or lack thereof) typically has little impact on the overall efficiency of the invention, so other known techniques can be used without defeating the benefits of the invention.

The finite state machine of the invention may be implemented directly in hardware or as a software program on a computer.

Figure 14:
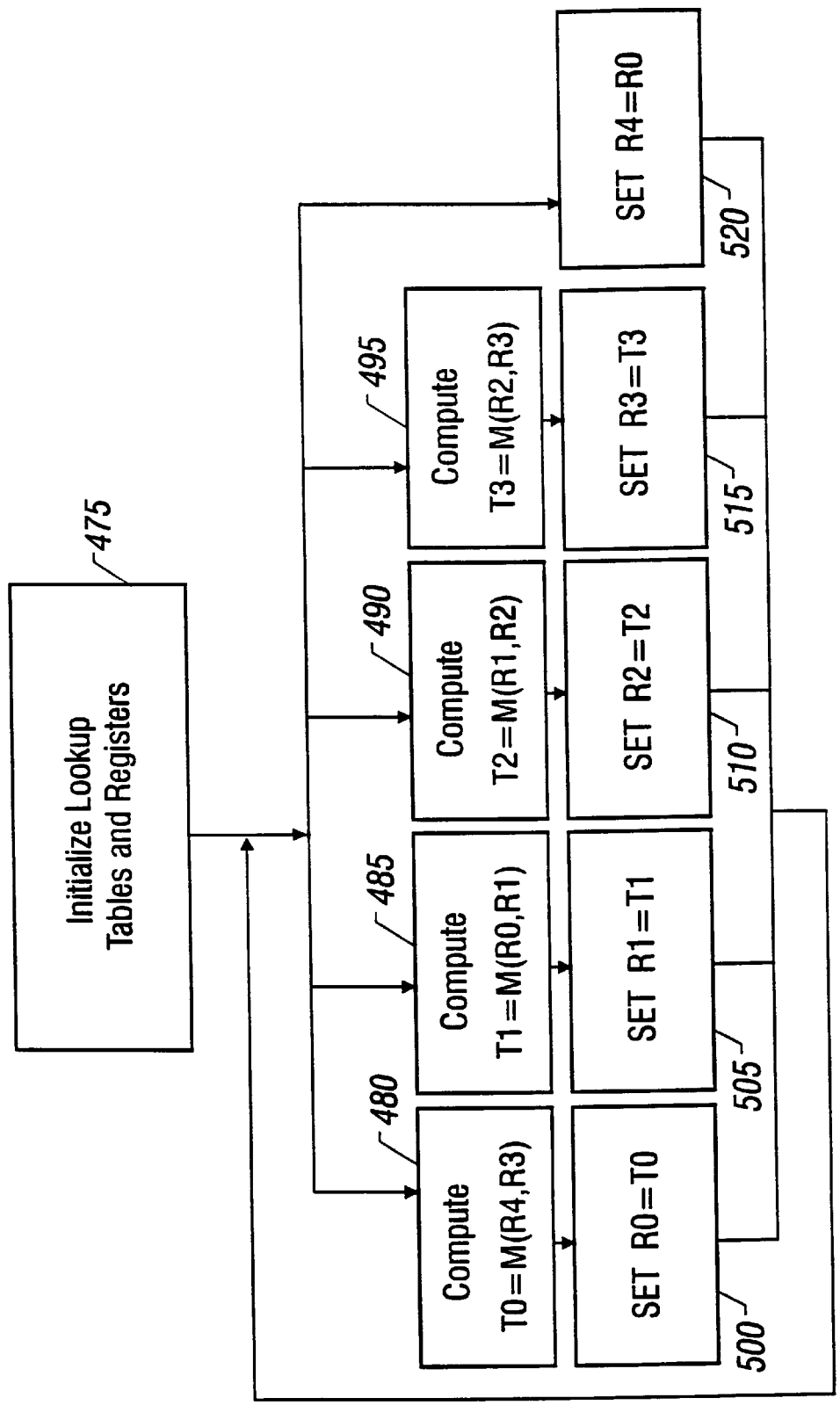
FIG. 14 is a flow chart showing a program for implementing a WiderWake finite state machine on a computer having instruction level parallelism.

Thus in operation, an operational flow diagram of the type illustrated FIG. 4(a) can be implemented on a processor having "n" datapaths (where, in this example, n=4) as follows. Referring to FIG. 14, first, all of the lookup tables and registers are initialized (step 475). Next, in parallel, all of the mixing functions compute new values based on the current state of the registers (steps 480, 485, 490, 495). Then, in parallel, each of the registers receiving output from a mixing function is updated with the computed value (steps 500, 505, 510, and 515), while at the same time, the register which receives input from a second register is updated with the value of the second register (step 520). The process then repeats for each output word generated.

Attached as Exhibit "A" to this application is a paper by the inventor entitled "Optimizing a Fast Stream Cipher for VLIW, SIMD, and Superscalar Processors" which describes in more detail some of the preferred embodiments and their theoretical properties.

What is claimed is:

1. A pseudo-random number generator comprising:
   a. a plurality of nonlinear mixers, each such mixer having a plurality of w-bit inputs and a single w-bit output; and
   b. a plurality of registers capable of holding w-bit words, such that the plurality of nonlinear mixers and the plurality of registers are connected in a network wherein:
      a. the input of each of the registers is the output of another register, the output of a mixer, or an external data stream;
      b. each of the inputs of each mixer is either the output of a register, the output of a mixer, or an external data stream, and is different from any other input to said mixer;
      c. every closed loop path that traverses all of the mixers also traverses more than one register;
      d. every closed loop path has at least one register in it; and
      e. the output of at least one of the registers or mixers is designated as the output of the finite state machine.

2. The pseudo-random number generator claimed in claim 1, wherein each mixer take two inputs.

3. The pseudo-random number generator claimed in claim 1, wherein there is a path from the output of each mixer to one of the inputs of said mixer, in which none of the components are mixers.

4. The pseudo-random number generator claimed in claim 1, wherein all of the mixers implement the same function.

5. The pseudo-random number generator claimed in claim 1, wherein there is at least one mixer which has an input in common with the input of a register and the function implemented by each mixer is invertible.

6. The pseudo-random number generator claimed in claim 1, wherein there is at least one path from every component to every other component.

7. The pseudo-random number generator claimed in claim 1, wherein a first data stream is generated externally to the finite state machine by applying a combining function to a second data stream generated externally to the finite state machine and the output of one of the components of the finite state machine.

8. The pseudo-random number generator claimed in claim 7, wherein an input to a component of the pseudo-random number generator is the first data stream.

9. The pseudo-random number generator claimed in claim 8, wherein exactly one component of the pseudo-random number generator has as an input said first data stream.

10. The pseudo-random number generator claimed in claim 7, wherein the combining function is a bitwise exclusive-OR.

11. The pseudo-random number generator claimed in claim 1, wherein no input to a component of the pseudo-random number generator is a data stream generated externally to the pseudo-random number generator.

12. The pseudo-random number generator claimed in claim 1, wherein each mixer comprises a first intermediate combiner for combining two inputs into an intermediate value, a mechanism for extracting the low byte of said intermediate value and using it as an index to select a value from a lookup table, and second combiner for combining the output of the lookup table with the intermediate value logically shifted right 8-bits.

13. The pseudo-random number generator claimed in claim 12, wherein the first combiner combines bits by an exclusive-OR operation and the second combiner is either an adder or subtractor.

14. The pseudo-random number generator claimed in claim 12, wherein the first combiner is either an adder or a subtractor and the second combiner combines bits by an exclusive-or operation.

15. In a finite state machine having a plurality of registers, including an ordered set of N result registers R(i), where $0<i<N+1$, each result register having respective integral characteristic delay values a(i), b(i) and c(i), such that $a(i)+b(i)>0$ and at least one of b(i) and c(i) equals zero, a method for generating a stream of pseudo-random numbers comprising repeatedly, over a series of time steps:

for each result register R(i), where $1<i<N+1$, storing therein a value calculated by combining a pair of input values using a respective non-linear combining function, the pair of input values consisting of the value that was stored in result register R(i−1), a(i−1)+c(i−1) time steps prior to the current time step, and the value that was stored in result register R(i), a(i)+b(i) time steps prior to the current time step; and storing, in result register R(1), a value calculated by combining a pair of input values using a non-linear combining function, the pair of input values consisting of the value stored in result register R(N), a(N)+c(N) time steps prior to the current time step, and the value stored in result register R(1), a(1)+b(1) time steps prior to the current time step; and wherein, in a data flow diagram showing the flow of data through the finite state machine, every closed loop data path that includes each of the N combining functions cannot be traversed in less than two time steps.

16. The method of claim 15, wherein the non-linear combining functions are identical.

17. The method of claim 15, wherein the non-linear combining functions are invertible.

18. The method of claim 15, wherein each non-linear combining function combines two inputs into an intermediate value using a second combining function, extracts the low byte of said intermediate value and, using the low byte as an index into a lookup table, combines the output of the lookup table with said intermediate value logically shifted right 8-bits using a third combining function.

19. The method of claim 18, wherein one of the intermediate combining functions is exclusive-OR and the other intermediate combining function is either PLUS or MINUS.

20. The method of claim 15, wherein for all integral values of i such that $0<i<N$, a(i)=1 and b(i)=0, and wherein a(N)=0 and b(N)=1.

21. The method of claim 20, wherein for all integral values of i such that $0<i<N+1$, c(i)=0.

22. The method of claim 15, wherein a(1)=1, b(1)=1, a(N)=1, b(N)=0, and, for all integral values of i such that $1<i<N$, a(i)=1 and b(i)=0 or 1.

23. The method of claim 22, wherein for all integral values of i such that $1<i<N+1$, $b(i)=0$.

24. The method of claim 22, wherein for all integral values of i such that $0<i<N$, $b(i)=1$.

25. In a finite state machine having a plurality of registers, a method for generating a stream of pseudo-random numbers comprising repeatedly, over a series of time steps:

calculating N result values by combining respective pluralities of input values, each combination using a non-linear combining function; and storing at least one result value in a register for use as an input value during a subsequent time step; and wherein, for each result value calculated during a given time step:

each value in the respective plurality of input values used to calculate the result value is itself a result value that was calculated during the given time step or during a previous time step, except that one of the pluralities of input values may include a value produced by combining a result value with a value from an input stream; and wherein, in a data flow diagram showing the flow of data through the finite state machine, every closed loop data path that includes each of the N combining functions cannot be traversed in less than two time steps.

26. The method of claim 25, wherein each respective plurality of input values consists of two values and each non-linear combining function is a function of two inputs.

27. The method of claim 25, wherein each non-linear combining function is identical.

28. The method of claim 25, wherein each non-linear combining function is invertible; and wherein for at least one result value calculated on a given time step, one of the input values used to calculate the result value is also stored in a register and used as an input value for calculating a result value on a subsequent time step.

29. The method of claim 25, wherein each plurality of input values consists only of values that were each calculated by applying a non-linear combining function to respective sets of values.

30. The method of claim 25, wherein each non-linear combining function combines two inputs with a first intermediate combining function into an intermediate value, extracts the low byte of said intermediate value and uses it as an index to select a value from a lookup table, and combines the output of the lookup table with the intermediate value logically shifted right 8-bits with a second intermediate combining function.

31. The method of claim 30, wherein the first intermediate combining function is a bitwise exclusive-OR and the second intermediate combining function is an adder or a subtracter.

32. The method of claim 30, wherein the first intermediate combining function is an adder or a subtracter and the second intermediate combining function is a bitwise exclusive-OR.

33. A pseudo-random number generator, having a plurality of registers, including an ordered set of N result registers $R(i)$, each result register having respective integral characteristic delay values $a(i)$, $b(i)$ and $c(i)$, such that for any integral value of $0<i<N+1$, $a(i)+b(i)>0$, and at least one of $b(i)$ and $c(i)$ equals zero, comprising:

for each result register $R(i)$, where $1<i<N+1$, means for repeatedly, over a series of time steps, storing therein a value calculated by combining a pair of input values using a respective non-linear combining function, the pair of input values consisting of the value that was stored in result register $R(i-1)$, $a(i-1)+c(i-1)$ time steps prior to the current time step, and the value that was stored in result register $R(i)$, $a(i)+b(i)$ time steps prior to the current time step; and means for repeatedly, over the same series of time steps, storing in result register $R(1)$ a value calculated by combining a pair of input values using a non-linear combining function, the pair of input values consisting of the value stored in result register $R(N)$, $a(N)+c(N)$ time steps prior to the current time step, and the value stored in result register $R(1)$, $a(1)+b(1)$ time steps prior to the current time step, wherein, in a data flow diagram showing the flow of data through the pseudo-random number generator, every closed loop data path that includes each of the N combining functions cannot be traversed in less than two time steps.

34. The pseudo-random number generator of claim 33, wherein the non-linear combining functions are identical.

35. The pseudo-random number generator of claim 33, wherein the non-linear combining functions are invertible.

36. The pseudo-random number generator of claim 33, wherein each non-linear combining function combines two inputs into an intermediate value using a second combining function, extracts the low byte of said intermediate value and, using the low byte as an index into a lookup table, combines the output of the lookup table with said intermediate value logically shifted right 8-bits using a third combining function.

37. The pseudo-random number generator of claim 36, wherein one of the intermediate combining functions is exclusive-OR and the other intermediate combining function is either PLUS or MINUS.

38. The pseudo-random number generator of claim 33, wherein for all integral values of i such that $0<i<N$, $a(i)=1$ and $b(i)=0$; and wherein $a(N)=0$ and $b(N)=1$.

39. The pseudo-random number generator of claim 38, wherein for all integral values of i such that $0<i<N+1$, $c(i)=0$.

40. The pseudo-random number generator of claim 33, wherein $a(1)=1$, $b(1)=1$, $a(N)=1$, $b(N)=0$, and, for all integral values of i such that $1<i<N$, $a(i)=1$ and $b(i)=0$ or 1.

41. The pseudo-random number generator of claim 40, wherein for all integral values of i such that $1<i<N+1$, $b(i)=0$.

42. The pseudo-random number generator of claim 40, wherein for all integral values of i such that $0<i<N$, $b(i)=1$.

43. A pseudo-random number generator having a plurality of registers and comprising:

means for repeatedly, over a series of time steps, calculating a set of N result values by combining respective pluralities of input values, each combination using a non-linear combining function; and means for storing at least one result value calculated during each time step in a register for use as an input value during a subsequent time step, wherein, for each result value calculated during a given time step:

each value in the respective plurality of input values used to calculate the result value is itself a result value that was calculated during the given time step or during a previous time step, except that one of the pluralities of input values may include a value produced by combining a result value with a value from an input stream; and wherein, in a data flow diagram showing the flow of data through the pseudo-random number generator, every closed loop data path that includes each of the N combining functions cannot be traversed in less than two time steps.

44. The pseudo-random number generator of claim 43, wherein each respective plurality of input values consists of two values and each non-linear combining function is a function of two inputs.

45. The pseudo-random number generator of claim 43, wherein each non-linear combining function is identical.

46. The pseudo-random number generator of claim 43,
wherein each non-linear combining function is invertible; and
wherein for at least one result value calculated on a given time step, one of the input values used to calculate the result value is also stored in a register and used as an input value for calculating a result value on a subsequent time step.

47. The pseudo-random number generator of claim 43, wherein each plurality of input values consists only of values that were each calculated by applying a non-linear combining function to respective sets of values.

48. The pseudo-random number generator of claim 43, wherein each non-linear combining function combines two inputs with a first intermediate combining function into an intermediate value, extracts the low byte of said intermediate value and uses it as an index to select a value from a lookup table, and combines the output of the lookup table with the intermediate value logically shifted right 8-bits with a second intermediate combining function.

49. The pseudo-random number generator of claim 48, wherein the first intermediate combining function is a bitwise exclusive-OR and the second intermediate combining function is an adder or a subtractor.

50. The pseudo-random number generator of claim 48, wherein the first intermediate combining function is an adder or a subtractor and the second intermediate combining function is a bitwise exclusive-OR.

51. A computer program, residing on a computer-readable medium, capable of generating pseudo-random numbers, comprising instructions for causing a computer having a plurality registers, including an ordered set of N result registers $R(i)$, where $0<i<N+1$, each having characteristic delay values $a(i)$, $b(i)$ and $c(i)$, such that $a(i)+b(i)>0$ and at least one of $b(i)$ and $c(i)$ equals zero, to generate a stream of pseudo-random numbers by performing the steps of repeatedly, over a series of time steps:
for each result register $R(i)$, where $1<i<N+1$, storing therein a value calculated by combining a pair of input values using a non-linear combining function, the pair of input values consisting of the value that was stored in result register $R(i-1)$, $a(i-1)+c(i-1)$ time steps prior to the current time step, and the value that was stored in result register $R(i)$, $a(i)+b(i)$ time steps prior to the current time step; and
storing, in result register $R(1)$, a value calculated by combining a pair of input values using a non-linear combining function, the pair of input values consisting of the value stored in result register $R(N)$, $a(N)+c(N)$ time steps prior to the current time step, and the value stored in result register $R(1)$, $a(1)+b(1)$ time steps prior to the current time step,
wherein, in a data flow diagram showing the flow of data through the plurality of registers, every closed loop data path that includes each of the N combining functions cannot be traversed in less than two time steps.

52. The product of claim 51, wherein the non-linear combining functions are identical.

53. The product of claim 51, wherein the non-linear combining functions are invertible.

54. The product of claim 51, wherein each non-linear combining function combines two inputs into an intermediate value using a second combining function, extracts the low byte of said intermediate value and, using the low byte as an index into a lookup table, combines the output of the lookup table with said intermediate value logically shifted right 8-bits using a third combining function.

55. The product of claim 54, wherein one of the intermediate combining functions is exclusive-OR and the other intermediate combining function is either PLUS or MINUS.

56. The product of claim 51, wherein for all integral values of i such that $0<i<N$, $a(i)=1$ and $b(i)=0$; and wherein $a(N)=0$ and $b(N)=0$.

57. The product of claim 56, wherein for all integral values of i such that $0<i<N+1$, $c(i)=0$.

58. The product of claim 51, wherein $a(1)=1$, $b(1)=1$, $a(N)=0$, $b(N)=0$, and, for all integral values of i such that $1<i<N$, $a(i)=1$ and $b(i)=0$ or 1.

59. The product of claim 58, wherein for all integral values of i such that $1<i<N+1$, $b(i)=0$.

60. The product of claim 58, wherein for all integral values of i such that $0<i<N$, $b(i)=0$.

61. A computer program, residing on a computer-readable medium, capable of generating a stream of pseudo-random numbers, comprising instructions for causing a computer having a plurality of registers, to repeatedly, over a series of time steps, perform the steps of:
calculating N result values by combining respective pluralities of input values, each combination using a non-linear combining function; and
storing at least one of the result values in a register for use as an input value during a subsequent time step; and
wherein, for each result value calculated during a given time step:
each value in the respective plurality of input values used to calculate the result value is itself a result value that was calculated during the given time step or during a previous time step,
except that one of the pluralities of input values may include a value produced by combining a result value with a value from an input stream; and
wherein, in a data flow diagram showing the flow of data through the plurality of registers, every closed loop data path that includes each of the N combining functions cannot be traversed in less than two time steps.

62. The product of claim 61, wherein each respective plurality of input values consists of two values and each non-linear combining function is a function of two inputs.

63. The product of claim 61, wherein each non-linear combining function is identical.

64. The product of claim 61,
wherein each non-linear combining function is invertible; and
wherein for at least one result value calculated on a given time step, one of the input values used to calculate the result value is also stored in a register and used as an input value for calculating a result value on a subsequent time step.

65. The product of claim 61, wherein each plurality of input values consists only of values that were each calculated by applying a non-linear combining function to respective sets of values.

66. The product of claim 61, wherein each non-linear combining function combines two inputs with a first intermediate combining function into an intermediate value, extracts the low byte of said intermediate value and uses it as an index to select a value from a lookup table, and combines the output of the lookup table with the intermediate value logically shifted right 8-bits with a second intermediate combining function.

67. The product of claim 66, wherein the first intermediate combining function is a bitwise exclusive-OR and the second intermediate combining function is an adder or a subtractor.

68. The product of claim 66, wherein the first intermediate combining function is an adder or a subtractor and the second intermediate combining function is a bitwise exclusive-OR.

69. A finite state machine having registers and combinatorial logic circuits, a clocking circuit for generating a clock signal and defining a sequence of time steps, and an ordered set of N stages, wherein:

(a) each ith stage comprises a first ordered set of $A(i)$ registers $a(i,j)$, where $0<j<A(i)+1$, a second ordered set of $B(i)$ registers $b(i,k)$, where $0<k<B(i)+1$, and a third ordered set of $C(i)$ registers $c(i, m)$, where $0<m<C(i)+1$, and wherein $A(i)$, $B(i)$, and $C(i)$ are each greater than or equal to zero, $A(i)+B(i)$ is greater than or equal to 1, and either $B(i)$ or $C(i)$ is equal to zero, and a result register $r(i)$, which is register $a(i,1)$ if $A>0$, and otherwise is register $b(i,1)$;

(b) for each ith stage, the combinatorial logic circuit generates a value during each time step by applying a non-linear combining function $f(i)$ to two input values, $in(i,l)$ and $in(i,2)$;

(c) each result register $r(i)$ is responsive to the clock signal during each time step to receive the value generated by step (b);

(d) if $A(i)>1$, each register $a(i,j)$, where $j>1$, is responsive to the clock signal during each time step to receive a value previously stored in register $a(i,j-1)$ during the prior time step;

(e) if $B(i)>1$, each register $b(i,k)$, where $k>1$, is responsive to the clock signal during each time step to receive a value previously stored in register $b(i,k-1)$ during the prior time step;

(f) if $C(i)>1$, each register $c(i,m)$, where $m>1$, is responsive to the clock signal during each time step to receive a value previously stored in register $c(i,m-1)$ during the prior time step;

(g) if $A(i)>0$ and $B(i)>0$, register $b(i,1)$ is responsive to the clock signal during each time step to receive a value previously stored in register $a(i,A(i))$ during the prior time step;

(h) if $A(i)>0$ and $C(i)>0$, register $c(i,1)$ is responsive to the clock signal during each time step to receive a value previously stored in register $a(i,A(i))$ during the prior time step;

(i) if $A(i)=0$ and $C(i)>0$, register $c(i,1)$ is responsive to the clock signal during each time step to receive the value generated by step (b);

(j) for each ith stage, $in(i,1)$ is:
the value previously stored in register $a(i,A(i))$ during the prior time step if $B(i)=0$; or
the value previously stored in register $b(i,B(i))$ during the prior time step if $B(i)>0$;

(k) for each ith stage, where $i>1$, $in(i,2)$ is:

the value previously stored in register $c(i-1,C(i-1))$ during the prior time step, if $C(i-1)>0$;
the value previously stored in register $a(i-1),A(i-1))$ during the prior time step, if $A(i-1)>0$ and $C(i-1)=0$; or
the value generated by the arithmetic logic by applying $f(i-1)$ to $in(i-1,1)$ and $in(i-1,2)$ during the same time step, if $A(i-1)+C(i-1)=0$;

(l) $in(1,2)$ is:
the value previously stored in register $c(N,C(N))$ during the prior time step, if $C(N)>0$;
the value previously stored in register $a(N), A(N))$ during the prior time step, if $A(N)>0$ and $C(N)=0$; or
the value generated by the arithmetic logic by applying $f(N)$ to $in(N,1)$ and $in(N,2)$ during the same time step, if $A(N)+C(N)=0$; and (m) in a data flow diagram showing the flow of data through the finite state machine, every closed loop data path that includes each of the N combining functions also includes at least two registers.

70. The finite state machine of claim 69, wherein the non-linear combining functions $f(i)$ are identical.

71. The finite state machine of claim 69, wherein the non-linear combining functions $f(i)$ are all invertible.

72. The finite state machine of claim 69, wherein each non-linear combining function $f(i)$ combines two inputs into an intermediate value using a second combining function, extracts the low byte of said intermediate value and, using the low byte as an index into a lookup table, combines the output of the lookup table with said intermediate value logically shifted right 8-bits using a third combining function.

73. The finite state machine of claim 72, wherein one of the intermediate combining functions is exclusive-OR and the other intermediate combining function is either PLUS or MINUS.

74. The finite state machine of claim 69, wherein for all integral values of i such that $0<i<N$, $A(i)=1$ and $B(i)=0$, and wherein $A(N)=0$ and $A(N)=0$.

75. The finite state machine of claim 74, wherein for all integral values of i such that $0<i<N+1$, $C(i)=0$.

76. The finite state machine of claim 69, wherein $A(1)=1$, $B(1)=1$, $A(N)=1$, $B(N)=0$, and, for all integral values of i such that $1<i<N$, $A(i)=1$ and $B(i)=0$ or 1.

77. The finite state machine of claim 76, wherein for all integral values of i such that $1<i<N+1$, $B(i)=0$.

78. The finite state machine of claim 76, wherein for all integral values of i such that $0<i<N$, $(i)=1$.

79. A finite state machine for generating a stream of pseudo-random numbers, having a plurality of registers, a clocking circuit for generating a clock signal and defining a sequence of time steps, and combinatorial logic circuits, wherein:

the combinatorial logic circuits generate N output values during each time step by applying N respective non-linear combining functions to N respective sets of input values, the input values in each set being either values that were previously stored in a register during a prior time step, or output values generated during the same time step, except that one of the N sets of input values may be the result of combining a previously stored value, or an output value generated during the same time step, with a value from an input stream;

no two input values in one of the N sets of input values is from the same immediate source;

each register is responsive to the clock signal during each time step to receive either a) one of the output values generated by the combinatorial logic circuits during the time step or b) a value stored in another register during a prior time step;

each register is responsive to the clock signal during each time step to provide its value to either a) another register or b) the combinatorial logic circuits for calculating one of the N output values; and in a data flow diagram showing the flow of data through the finite state machine:

every closed loop data path includes at least one register;

there is at least one closed loop data path that includes each of the N combining functions; and every closed loop data path that includes each of the N combining functions also includes at least two registers.

80. The finite state machine of claim 74, wherein each set of input values consists of two values and each non-linear combining function is a function of two inputs.

81. The finite state machine of claim 74, wherein each non-linear combining function is identical.

82. The finite state machine of claim 74, wherein each non-linear combining function is invertible; and wherein at least one of the registers is responsive to the clock signal to receive, during each time step, one of the values in one of the sets of input values.

83. The finite state machine of claim 74, wherein each set of input values consists only of values that were previously stored in a register during a prior time step, or output values generated during the same time step.

84. The finite state machine of claim 74, wherein each non-linear combining function combines two inputs with a first intermediate combining function into an intermediate value, extracts the low byte of said intermediate value and uses it as an index to select a value from a lookup table, and combines the output of the lookup table with the intermediate value logically shifted right 8-bits with a second intermediate combining function.

85. The finite state machine of claim 84, wherein the first intermediate combining function is a bitwise exclusive-OR and the second intermediate combining function is an adder or a subtractor.

86. The finite state machine of claim 84, wherein the first intermediate combining function is an adder or a subtractor and the second intermediate combining function is a bitwise exclusive-OR.

\* \* \* \* \*